United States Patent [19]

Cruess et al.

[11] Patent Number: 4,890,223

[45] Date of Patent: Dec. 26, 1989

[54] PAGED MEMORY MANAGEMENT UNIT WHICH EVALUATES ACCESS PERMISSIONS WHEN CREATING TRANSLATOR

[75] Inventors: Michael W. Cruess; William C. Moyer, both of Austin, Tex.; John Zolnowsky, Milpitas, Calif.

[73] Assignee: Motorola, Inc., Schaumburg, Ill.

[21] Appl. No.: 223,731

[22] Filed: Jul. 21, 1988

Related U.S. Application Data

[63] Continuation of Ser. No. 819,179, Jan. 15, 1986, abandoned.

[51] Int. Cl.$^4$ .................... G06F 12/10; G06F 12/14
[52] U.S. Cl. ............................ 364/200; 364/256.3; 364/256.4; 364/243.41; 364/254.3; 364/246.6
[58] Field of Search ........................... 364/200, 900

[56] References Cited

U.S. PATENT DOCUMENTS

| | | | |
|---|---|---|---|
| 4,392,201 | 7/1983 | Brown et al. | 364/200 |
| 4,442,484 | 4/1984 | Childs, Jr. et al. | 364/200 |
| 4,525,780 | 6/1985 | Bratt et al. | 364/200 |
| 4,669,043 | 5/1987 | Kaplinsky | 364/200 |
| 4,763,244 | 8/1988 | Moyer et al. | 364/200 |
| 4,763,250 | 8/1988 | Keshlear et al. | 364/200 |

OTHER PUBLICATIONS

MCG8851 Paged Memory Management Unit User's Manual, 1986 by Motorola Inc., pp. 5–1 to 5–30 and 7–1 to 7–16.
MCG8020 32-Bit Microprocessor User's Manual, 1984 by Motorola Inc., pp. 8–6.

*Primary Examiner*—Gareth D. Shaw
*Assistant Examiner*—Paul Kulik
*Attorney, Agent, or Firm*—Jeffrey Van Myers

[57] ABSTRACT

A paged memory management unit (PMMU) adapted to translate each of a plurality of logical addresses into a corresponding physical address using a selected one of a plurality of descriptors comprising one or more translation tables stored in a memory, the PMMU assembling each of the logical addresses and the corresponding physical address into a respective translator. In general, the PMMU includes: a cache having a plurality of storage locations for storing the translators, each of the storage locations including a write protect indicator and a read protect indicator adapted to be selectively set; translation control logic for storing an assembled translator in a selected one of the storage locations, the translation control logic setting the write protect indicator of the one storage location in response to a write protect signal associated with the descriptor used to assemble the translator and the read protect indicator of the one storage location in response to a read protect signal associated with that descriptor; and access control logic for preventing the translator from being used to translate the logical address in support of a write operation if the write protect indicator of the one storage location is set or in support of a read operation if the read protect indicator of the one storage location is set. In the preferred form, the logical address has an access privilege level associated therewith and the descriptor includes a selected write access privilege level and a selected read access privilege level, the translation control logic setting the write protect indicator of the one storage location if the access privilege level associated with the logical address is logically less than the write access privilege level and the read protect indicator of the one storage location if the access privilege level associated with the logical address is logically less than the read access privilege level.

22 Claims, 5 Drawing Sheets

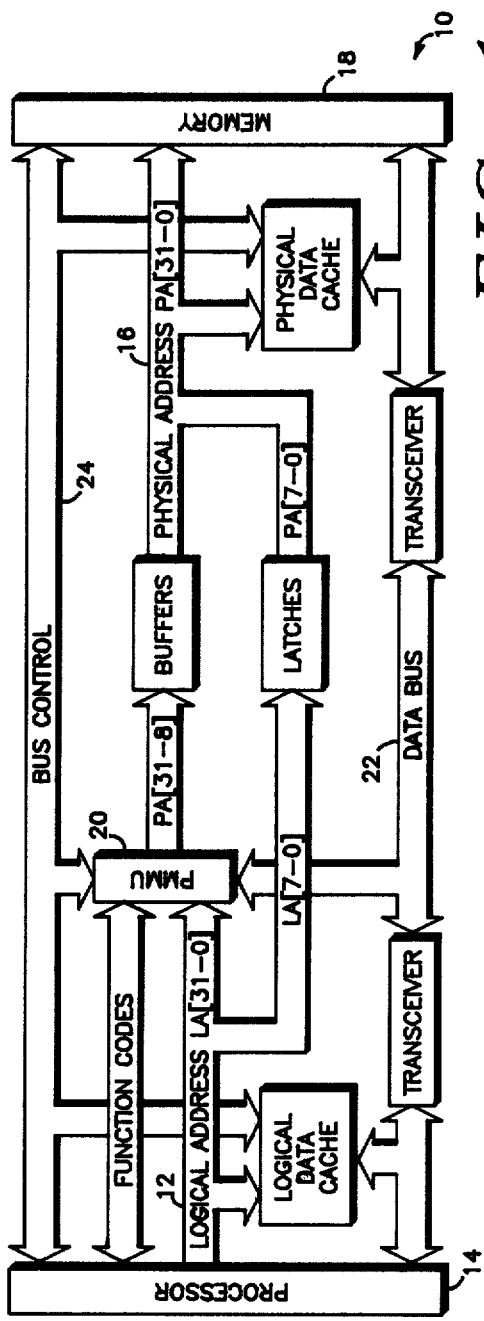
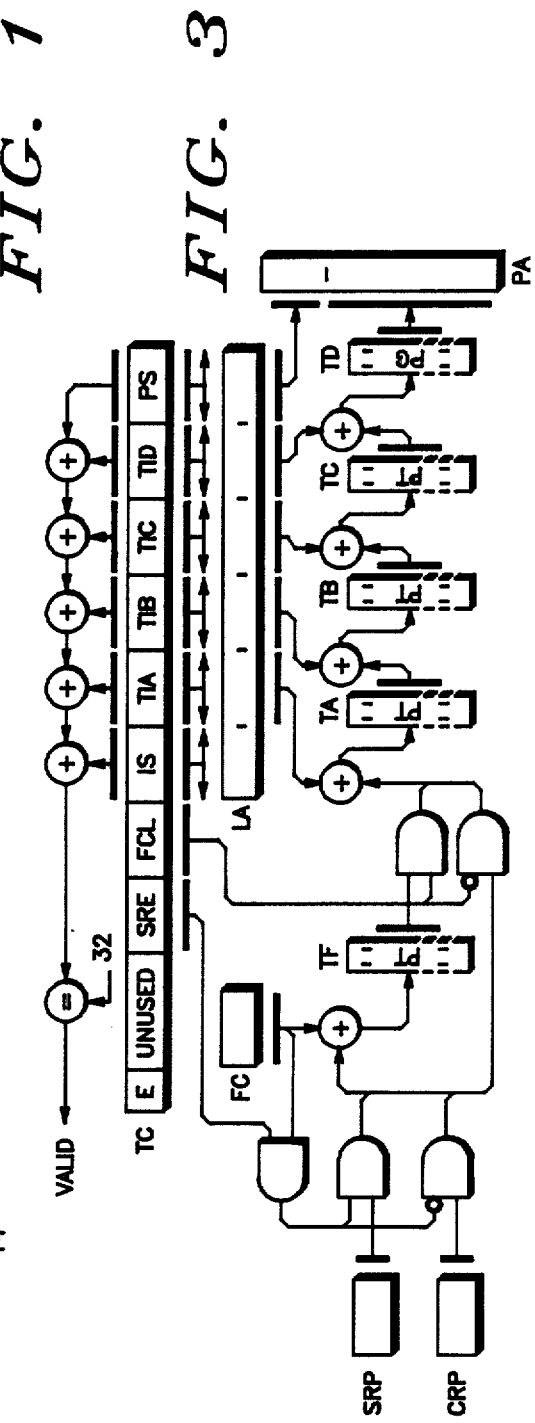
FIG. 1
FIG. 3

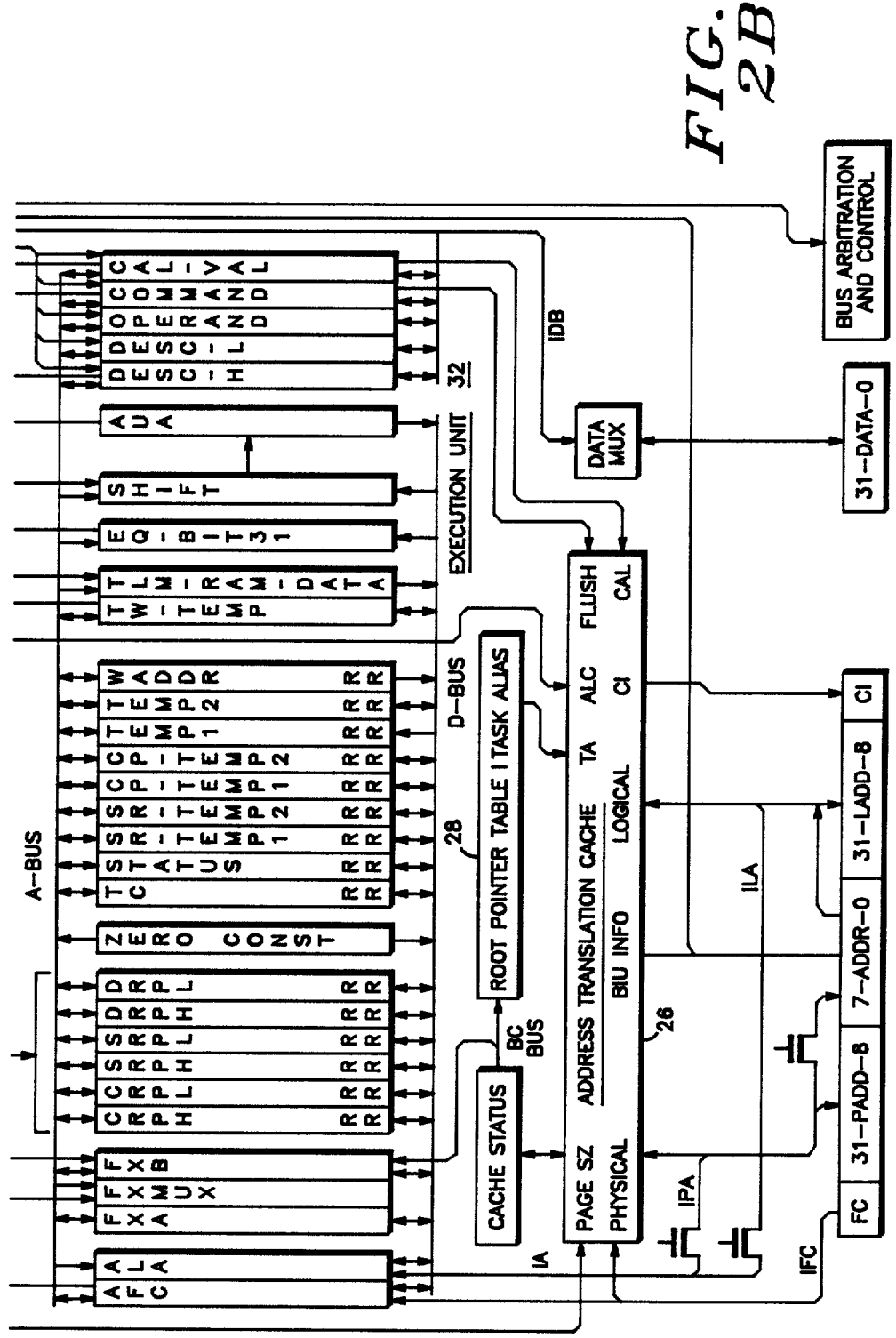

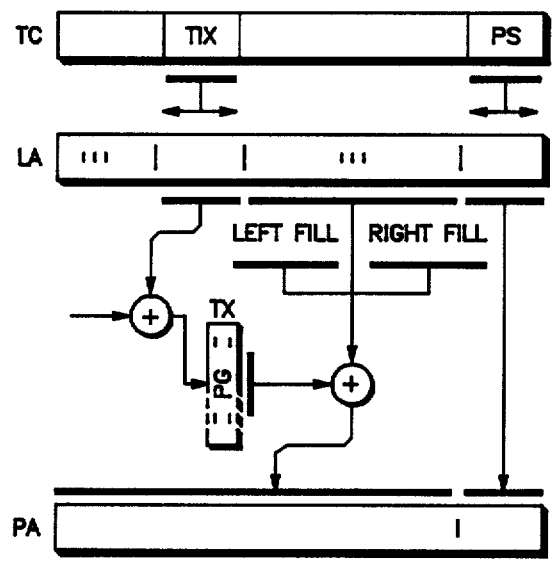
FIG. 4
FIG. 5
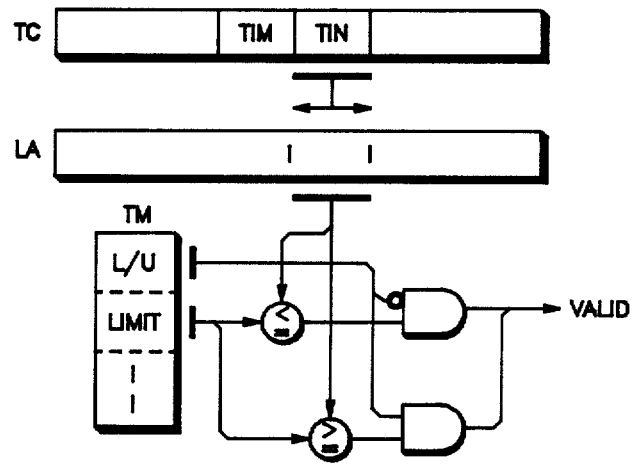

PAGED MEMORY MANAGEMENT UNIT WHICH EVALUATES ACCESS PERMISSIONS WHEN CREATING TRANSLATOR

This application is a continuation, of application Ser. No. 819,179, filed Jan. 15, 1986, now abandoned.

CROSS REFERENCE TO RELATED APPLICATIONS

Related subject matter is disclosed in the following copending applications, all of which are assigned to the same Assignee as the subject invention:

1. U.S. Pat. No. 4,763,250 entitled PAGED MEMORY MANAGEMENT UNIT HAVING VARIABLE NUMBER OF TRANSLATION TABLE LEVELS, invented by William Mall Keshlear, William C. Moyer and John Zolnowsky, issued Aug. 4, 1988;

2. U.S. Application Ser. No. 718,669 (now abandoned) entitled PAGED MEMORY MANAGEMENT UNIT HAVING VARIABLE SIZED TRANSLATION TABLES, invented by William C. Moyer, John Zolnowsky and William Mall Keshlear, filed Apr. 1, 1985;

3. U.S. application Ser. No. 718,608 (not abaondoned) entitled PAGED MEMORY MANAGEMENT UNIT HAVING SELECTED TRANSLATION TABLE INDEXES, invented by Michael W. Cruess, William Mall Keshlear and John Zolnowsky, filed Apr. 1, 1985; and 4. U.S. application Ser. No. 626,363 (now abandoned) entitled DATA PROCESSOR HAVING MODULE ACCESS CONTROL, invented by John Zolnowksy, Michael W. Cruess and Douglas B. MacGregor, filed Apr. 16, 1985;

5. U.S. application Ser. No. 819,178 entitled PAGED MEMORY MANAGEMENT UNIT HAVING A TRANSLATION DESCRIPTOR GATE MECHANISM, invented by Michael W. Cruess and John Zolnowsky, filed Jan. 15, 1986 now abandoned in favor of U.S. application Ser. No. 07/212,166;

6. U.S. application Ser. No. 819,177 (now abandoned) entitled PAGED MEMORY MANAGEMENT UNIT HAVING MODULE ACCESS PROTECTION, invented by Michael W. Cruess and John Zolnowsky, filed Jan. 15, 1986;

7. U.S. Pat. No. 4,766,537 entitled PAGED MEMORY MANAGEMENT UNIT HAVING STACK CHANGE CONTROL REGISTER, invented by John Zolnowsky, issued Aug. 23, 1988, and 8. U.S. application Ser. No. 815,596 entitled PAGED MEMORY MANAGEMENT UNIT CAPABLE OF SELECTIVELY FLUSHING SHARED TRANSLATORS IN A TRANSLATION CACHE, invented by Michael W. Cruess, Ralph McGarity and William C. Moyer, filed Jan. 2, 1986.

9. U.S. Pat. No. 4,763,244 entitled PAGED MEMORY MANAGEMENT UNIT CAPABLE OF SELECTIVELY SUPPORTING MULTIPLE ADDRESS SPACES, invented by William Moyer, Michael Cruess, William Keshlear and John Zolnowsky, filed Jan. 15, 1986.

10. U.S. Pat. No. 4,800,489 entitled PAGED MEMORY MANAGEMENT UNIT CAPABLE OF SELECTIVELY SUPPORTING MULTIPLE ADDRESS SPACES, invented by William Moyer, Michael Cruess, William Keshlear and John Zolnowsky, filed May 19, 1988 as a division of Ser. No. 819,180, Jan. 15, 1986, U.S. Pat. No. 4,763,244.

BACKGROUND OF THE INVENTION

The subject invention relates generally to a paged memory management unit (PMMU) for use in a data processing system, and, more particularly, to a PMMU which supports access protection to portions of a logical address space.

In some data processing systems, a paged memory management unit (PMMU) is used to translate a logical portion of an address provided by a processor to a memory via an address bus into a corresponding portion of a physical address. Often, associated with the PMMU is a translation cache comprising a plurality of storage locations for storing recently used translators. In response to each logical address provided by the processor, the PMMU searches the translation cache for a corresponding logical-to-physical translator. If none is found, the processor is directed to abort the access cycle and release the system bus so that the PMMU can access a set of translation tables stored in the memory to determine the proper logical-to-physical address translator to enter in the translation cache. Subsequently, when the processor restarts the aborted access cycle, the PMMU will use the new translator in the translation cache to determine the proper physical address to forward to the memory. Thereafter, whenever the processor again accesses a logical address in the same logical page, the PMMU will reuse the translator in the translation cache.

In simple virtual memory systems, there is only a single "privilege level", that of the program currently executing in the processor. Since the PMMU has access to only a single set of translation tables, the same access privileges are applied to all accesses made by that program. In some applications, however, it is desirable to provide different privileges to certain broad classes of accesses which might be made by that program.

In some virtual memory systems, a plurality of separate and distinct "address spaces" are provided and assigned as needed to particular programs. For example, in U.S. Pat. No. 4,430,705, the processor provides an "Address Space Number" together with each logical address so that the PMMU can access the particular set of translation tables appropriate for the program assigned that address space. (See, also, U.S. Pat. Nos. 4,057,848, 4,068,303, 4,145,738, and 4,326,248.) Thus, different access privileges can be applied to each different address space as appropriate. On the other hand, since each program is typically assigned only a single address space, there is still no way to apply different access privileges to independent routines or "modules" within a given program.

In other virtual memory systems, not only are different access privileges assigned to the supervisor and user programs, but separate privileges may also be provided for the instructions and the data of each of these categories of programs. For example, in the data processing system described in U.S. Pat. Nos. 4,084,225, 4,084,226, and 4,084,227, the processor provides a "task name" together with each logical address to advise the PMMU which address space to use to translate that logical address. In U.S. Pat. No. 4,241,401, this system is expanded to provide for a plurality of "interrupt levels" and the PMMU is enabled to distinguish between multiple executions of the same task at different interrupt levels to assure that a task executing at one interrupt level cannot use the translators of the same task executing at a different interrupt level. However, while these systems allow code and data of a given program to have different access privileges, none allow different portions of the code or data spaces to have different access privileges.

In U.S. Pat. No. 4,434,464, code and data areas of memory are protected using unique "memory protection" keys which are maintained in the processor. If access to an area having a more restrictive key is required, a special instruction may be executed to temporarily alter the protection key of the executing program. In general, it appears feasible to include such access protection information in the cache of a virtual memory system. However, in addition to significantly expanding the width of the cache, the time and hardware required to perform access protection verification on a cycle-by-cycle basis is quite significant.

SUMMARY OF THE INVENTION

Accordingly, it is an object of the present invention to provide a mechanism which allows all access permissions to be evaluated during the creation of each translator.

Another object is to provide a mechanism which allows all access permissions to be efficiently summarized in each translator.

These and other objects of the present invention are achieved in a paged memory management unit (PMMU) adapted to translate each of a plurality of logical addresses into a corresponding physical address using a selected one of a plurality of descriptors comprising one or more translation tables stored in a memory, the PMMU assembling each of the logical addresses and the corresponding physical address into a respective translator. In general, the PMMU includes a cache having a plurality of storage locations for storing the translators, each of the storage locations including a write protect indicator and a read protect indicator adapted to be selectively set; cache control logic for storing an assembled translator in a selected one of the storage locations, the cache control logic setting the write protect indicator of that storage location in response to a write protect signal associated with the descriptor used to assemble that translator and setting the read protect indicator of that storage location in response to a read protect signal associated with the descriptor used to assemble that translator; and access control logic for preventing a translator from being used to translate a logical address in support of a write operation if the write protect indicator of the respective storage location is set and preventing the translator from being used to translate that logical address in support of a read operation if the read protect indicator of that one storage location is set. In accordance with the present invention, the logical address has an access privilege level associated therewith and each descriptor includes a selected write access privilege level and a selected read access privilege level, the cache control logic setting the write protect indicator of a storage location if the access privilege level associated with the respective logical address is logically less than the write access privilege level associated with the corresponding descriptor and setting the read protect indicator of that storage location if the access privilege level associated with the logical address is logically less than the read access privilege level associated with the descriptor. In the preferred form, the translation tables are comprised of one or more descriptor tables each comprised of a plurality of the descriptors, and a plurality of pointer tables each comprised of one or more table pointers to respective ones of the decriptor tables, the PMMU translating each logical address into the corresponding physical address by first combining a first portion of the logical address and a selected root pointer to access a first one of the pointer tables to obtain therefrom a table pointer to a selected one of the descriptor tables and then combining a second portion of the logical address and the table pointer to access a particular descriptor table to obtain therefrom the actual physical address. In this form, the write and read protect signals may comprise portions of each table pointer and be thereby associated with all descriptors comprising the corresponding descriptor table. In either form, the write and read protect signals may comprise portions of the descriptors themselves. Preferably, the write and read protect indicators comprise indicators which preexist in the translator for other related functions.

BRIEF DESCRIPTION OF THE DRAWINGS

FIG. 1 is a block diagram of a data processing system having a paged memory management unit (PMMU) constructed in accordance with the preferred embodiment of the present invention.

FIGS. 2A and 2B are a block diagram of the PMMU of FIG. 1.

FIG. 3 illustrates the translation table walking procedure of the PMMU of FIG. 2.

FIG. 4 illustrates the early termination of the table walking procedure of FIG. 3.

FIG. 5 illustrates the translation table size validation mechanism of the table walking procedure of FIG. 3.

DESCRIPTION OF THE INVENTION

Figure 2A:
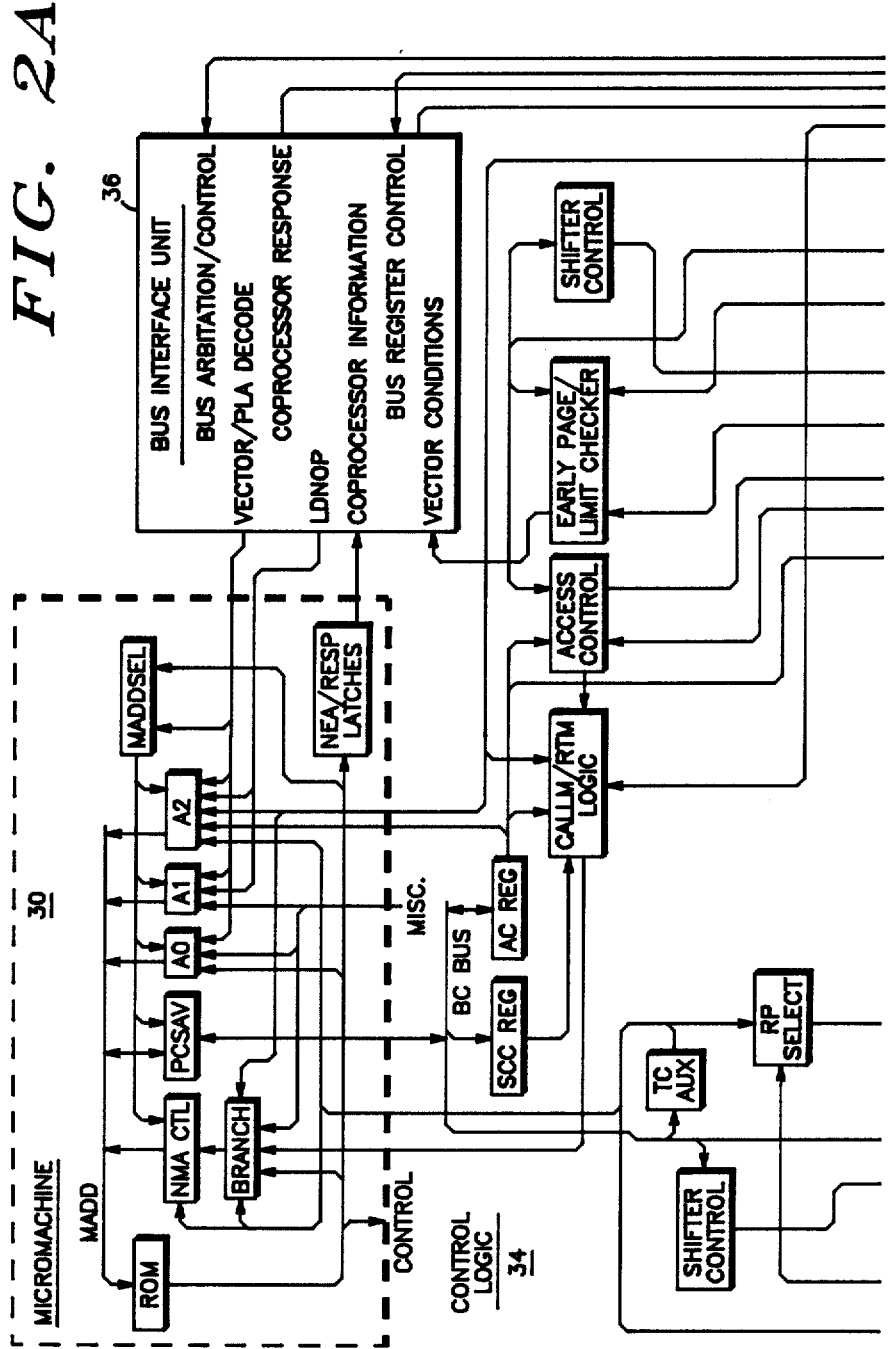

1. Summary of Operation:

In a simple data processing system, the processor is connected directly to memory. No memory mapping or protection is required, since the addresses generated by the processor are already Physical Addresses. In more ,sophisticated systems, a memory management unit is required to provide the mapping capability needed to support demand paged operation. In the data processing system 10 shown in FIG. 1, the address bus is broken into a Logical Address bus 12 coming from the Processor 14 and a Physical Address bus 16 going to the Memory 18, with a Paged Memory Management Unit (PMMU) 20 inserted between buses 12 and 16. In general, the PMMU 20 will also be connected to the Data bus 22 and the appropriate Bus Control signals 24.

In the preferred form of the PMMU 20 shown in FIG. 2, a fully associative Address Translation Cache (ATC) 26 stores a plurality, say 64, of recently used Logical Address to Physical Address translations. During address translation, the ATC 26 simultaneously compares the Logical Address and Function Code on the Logical Address bus 12 against each of the 64 entries. If one of the entries matches (there is a "hit"), the ATC 26 will drive the stored Physical Address out onto the external Physical Address bus. If no exception conditions are detected, the PMMU 20 then asserts a Physical Address Strobe (PAS) to indicate to the memory 18 that the Physical Address is valid.

In addition to the Logical and Physical Addresses, each entry in the ATC 26 also contains bits to implement an external data cache inhibit and certain write protect functions. When appropriate, the ATC 26 can lock selected entries to guarantee that the corresponding addresses will always hit. A warning mechanism is provided to prevent the locking of all entries in the ATC 26.

In order to provide improved cache utilization, the PMMU 20 has the ability to store entries for multiple tasks in the ATC 26 at the same time. To do this, the ATC 26 has additional bits in the Logical Address portion of each cache entry. This field is called the "task alias" and is used to determine if a hit occurs. The PMMU 20 also contains a Root Pointer Table (RPT) 28 containing recently used values of the CPU Root Pointer (CRP) register. When the CPU Root Pointer register is loaded with a new value, an entry is made in the RPT 28, a task alias value is assigned, and the ATC 26 is flushed of all entries that have that same task alias. This task alias value is used as an extension to the Logical Address. If a value is loaded into the CRP register that is already in the RPT 28, the old value of task alias is used and the cache is not flushed.

If the ATC 26 does not contain a translation for a Logical Address, a micromachine 30 cooperates with an execution unit 32 and some associated control logic 34 during a search or "walk" through the translation tables in memory for the correct translation. Prior to initiating the search, however, the bus interface unit (BIU) 36 aborts the bus cycle in progress and arbitrates for the buses 12, 16 and 22. The BIU 36 then asserts bus control signals that cause the current bus master to terminate the current bus cycle, release the bus, and wait to retry the aborted cycle when its "bus mastership" is returned.

Upon thereafter receiving mastership of the buses, the BIU 36 signals the micromachine 30 that the table walk may proceed. After the table walk has been completed, the micromachine 30 signals the BIU 43 to release the buses.

In the preferred form, the translation tables supported by the PMMU 20 have a tree structure. The root of a translation table tree is pointed to by one of the three Root Pointer registers: CPU, Supervisor, or DMA. Table entries at the upper levels of the tree are pointers to other tables. Entries in leaf tables are page frame numbers. All addresses in the translation tables are Physical Addresses.

In the preferred form, the processor 14 may selectively initialize certain control information available to the micromachine 30 to determine several aspects of the table walk. For example, although the first lookup in the table is normally by Function Code, this may be suppressed using a particular control bit. Another control field is available to specify that up to 15 high order Logical Address bits are to be ignored during the table walk. Certain other control fields are also provided so that the processor 14 may specify the number of levels, from 1 to 4, in the translation table, and the number of Logical Address bits, up to 15, to be used to index into each level.

2. Coprocessor Interface:

In the preferred form, the Processor 14 communicates with the PMMU 20 primarily using the Coprocessor Interface described in copending application Ser. No. 631,518. In general, this Interface, implemented in the micromachine 30 and BIU 36, provide access to the PMMU 20 programming model, controls the table walk functions, and supports virtual memory operation. The micromachine 30 and BIU 36 also implements the CALLM/RTM Interface described in copending application Ser. No. 626,363 to support module calls and returns and the associated access level checking.

In accordance with the Coprocessor 14 Interface, the Processor 14 communicates with the PMMU 20 by performing bus reads and writes from/to a set of "bus registers" in the execution unit 32. The BIU 36 determines that the bus registers are being accessed by decoding the Logical Address and the Function Code presented during a bus cycle. If the Function Code indicates a CPU Space access (0111), and the presented address is one of the addresses hardwired into the BIU 36, then the BIU 36 allows the corresponding bus register to be accessed. In this case Physical Address Strobe (PAS) is not asserted. The PMMU 20 contains two sets of bus registers in its bus Interface: Coprocessor Interface bus registers and access level control bus registers. The Coprocessor Interface bus registers consist of the following:

Response Register is a 16-bit register used by the PMMU 20 to request the Processor 14 to perform functions which must be performed in order for the PMMU 20 to complete the Command. The PMMU 20 will always acknowledge when the Response Register is accessed; accesses are always valid and no protocol violation can occur.

Control Register is a 16-bit register which is accessed by the processor to acknowledge a PMMU 20 exception request, or to abort a PMMU 20 instruction containing an illegal Effective Address field. The Processor 14 writes a mask into the Control Register. A mask with bit 1 set acknowledges and clears pending exceptions as described below. A mask with bit 0 set directs the PMMU 20 to abort processing of the current instruction, and to return to the Idle-Done state.

Save Register is a 16-bit register which, when read by the processor, causes the PMMU 20 to initiate a Save operation as described below. The data supplied by the PMMU 20 is a 16-bit Format word of the PMMU 20 internal state. The Processor 14 will read the Save Register until the PMMU 20 indicates that it is ready to initiate the Save sequence.

Restore Register is a 16-bit register which, when written to by the Processor 14, causes the PMMU 20 to immediately suspend any current operation, and prepare to do a Restore operation as described below. The data supplied by the Processor 14 is the 16-bit Format word of the Coprocessor internal state. After examining the Format word, the PMMU 20 indicates to the Processor 14 whether the Format Word is valid or not by placing a code in the Response Register. In addition, the PMMU 20 may indicate that the PMMU 20 is busy preparing for the restore, or that the PMMU 20 is ready for the transfer of the remainder of the state.

Operation Word Register is not implemented in the preferred form of the PMMU 20.

Command Register is a 16 bit register to which the Processor 14 writes a Command to initiate a PMMU 20 instruction.

Condition Register is a 16 bit register to which the Processor 14 writes a Condition Selection Code to specify a condition to be evaluated by the PMMU 20.

Operand Register is a 32 bit register through which the processor transfers data operands requested by the PMMU 20.

Register Selector is a 16 bit register by which the PMMU 20 can indicate to the Processor 14 which of the several registers in the Processor 14 are to be transferred to the PMMU 20.

Instruction Address Register is not implemented in the preferred form of the PMMU 20.

Operand Address Register is a 32-bit Register used by the processor to pass the source or destination address of an operand when the PMMU 20 requests such information. In the preferred form, the PMMU 20 is always assigned Coprocessor Number 0. Accordingly, the BIU 36 internally decodes Logical Addresses $00020000 through $0002001F, with a Function Code of 0111, as the Coprocessor Interface bus registers. However, since not all of these registers need to be available simultaneously, the execution unit 32 contains a minimum set of physical registers which are used as required to implement one or more of these bus registers. The functions of these bus registers are detailed in U.S. Pat. No. 4,729,094.

The PMMU 20 preferably implements the following Coprocessor instructions:

PMOVE moves data to or from PMMU 20 registers using the addressing modes available on the Processor 14. The operation is byte, word, long word, or double long word, depending on the size of the PMMU 20 register involved.

PVALID examines the access level bits of an operand Logical Address and does an unsigned compare against the access level bits of the VAL register. If the LA bits are arithmetically less than the VAL bits, this instruction causes a trap with the Access Level Violation vector.

PTEST takes a Logical Address and an associated Function Code, searches the ATC 26 or translation tables for an entry which translates this address. The results of the search are available in the Status register. Optionally, the address of the last descriptor used may be returned.

PLOAD takes a Logical Address and an associated Function Code, searches the translation table, and loads the ATC 26 with an entry to translate the address.

PFLUSH allows the PMMU 20 ATC 26 to be flushed in several ways: flush by Effective Address <ea>, by Function Code, or by both <ea> and Function Code.

PFLUSHR allows the flushing of all entries in the ATC 26 associated with a CPU root pointer value to be invalidated. The evaluated <ea> is used to fetch a double long word, the RPT is searched for this value, and the ATC is flushed if the value is found in the RPT.

Conditional Instructions, such as branch conditionally and set conditionally, provides tests for the following bits in the Status Register: B, L, S, A, W, I, G and C. The negation of the above conditions may also be tested.

PSAVE supports virtual memory capability, by saving the internal state of the PMMU 20 that deals with Coprocessor operation, and CALLM/RTM functions.

PRESTORE also supports virtual memory capability, by restoring the internal state of the PMMU 20 that was saved with PSAVE.

All PMMU 20 instructions are privileged except PVALID. An attempt to execute any other PMMU 20 instruction while the Processor 14 is in User state will cause a Coprocessor privilege exception. The access control bus registers allow the PMMU 20 to support the CALLM and RTM instructions described in copending application Ser. No. 626,363 (now abandoned).

The BIU 36 internally decodes the addresses $00010000 through $0001005F, with a Function Code of 0111, as its access level control bus registers. The access control bus registers consist of the following:

Current Access Level (CAL), when read, returns the value of the CAL and VAL registers. When written, the data is discarded and the bus cycle is terminated normally.

Access Level Status (ALS), when read, returns a code that indicates to the CALLM and RTM instructions what action should be taken on a module call or return. When written, the data is discarded and the bus cycle is terminated normally.

Increase Access Level (IAL), when written, causes the PMMU 20 to check the written value against the current access level to determine if the new value represents a valid access level change. The results of this check are made available in the ALS bus register. This bus register is used by the CALLM instruction.

Decrease Access Level (DAL), when written, causes the PMMU 20 to check the written value against the current access level to determine if the new value represents a valid access level change. The results of this check are made available in the ALS bus register. This bus register is used by the RTM instruction.

Descriptor Addresses (DA1-DA8) are addressable locations each of which represents a respective one of the 8 Function Codes. When one is written, the PMMU 20 checks the Logical Address and Function Code against the translation tables (like a PTEST instruction). The results of the test are available in the ALS register.

3. PMMU 20 Registers:

In the preferred form of the PMMU 20, there are several registers in the execution unit 32 that are used to control or monitor the translation and protection features of the PMMU 20: the CPU Root Pointer (CRP) register, the Supervisor Root Pointer (SRP) register, the DMA Root Pointer (DRP) register, the Cache Status (CS) register, the Translation Control (TC) register, the Access Control (AC) register, the Current Access Level (CAL) register, the Validate Access Level (VAL) register, the Stack Change Control (SCC) register, and a Status (STATUS) Register.

All PMMU 20 registers are directly accessible only to programs operating in supervisor state, but certain user instructions can access some registers in a limited fashion. The CALLM and RTM instructions can read and alter CAL and VAL. The PVALID instruction uses the contents of the VAL register to determine if it should cause a trap.

The CPU Root Pointer (CRP) is a 64 bit register containing a pointer to the root of the translation table tree for the current Processor 14 user task. It is written to on a task change to point to the root of a translation tree for the new task. Writing to this register also causes the Cache Status register to be updated. The CPU Root Pointer interacts with the Root Pointer Table (RPT) to improve ATC 26 utilization.

The Supervisor Root Pointer (SRP) is a 64 bit register which points to the root of the translation table to be used for translating supervisor accesses. However, the SRP is used only if the SRE bit of the Translation Control register is set. Reloading of the SRP causes flushing of all ATC 26 entries marked as supervisor. If the SRE bit of the Translation Control register is clear, the CRP is used for all processor initiated table walks.

The DMA Root Pointer (DRP) is a 64 bit register which points to the root of the translation table which may be used when an alternate logical bus master is translating through the PMMU 20. The entries in the ATC 26 loaded when an alternate bus master begins translation will be tagged as such. Reloading of this register causes flushing of all ATC 26 entries that were formed using the DRP.

The Cache Status (CS) register is a 16-bit register having the following format:

| 15 | 14 | 13 | 12 | 3 | 2 | 0 |
|----|----|----|----|----|----|----|
| F | LW | | UNUSED | | TA | | wherein:
F indicates if entries with the task alias value shown in the TA field were flushed from the PMMU 20's ATC 26.
  0 = not flushed
  1 = flushed
LW a lock warning bit indicating that all entries but one have been locked in the ATC 26. No additional entries will be locked into the ATC 26 until others are removed.
  0 = normal operation
  1 = 63 ATC 26 entries locked
TA indicates the current value of the internal task alias.

In general, CS is provided to assist in the maintenance of an external logical data cache. The PMMU 20 maintains entries for more than one task in the ATC 26, and some of its internal data is useful for other caches. This register is updated when the CRP register is written. The contents reflect the results of the RPT search. This register can be read with the PMOVE instruction.

The Translation Control (TC) register is a 32 bit register having the following format:

| 31 | 30 | 26 25 | 24 | 23 | 20 19 | 16 15 | 12 11 | 8 7 | 4 3 | 0 |
|----|----|-------|----|----|-------|-------|-------|-----|-----|---|
| E | UNUSED | SRE | FCL | PS | IS | TIA | TIB | TIC | TID | | wherein:
E (Enable) enables and disables address translation.
  0 disabled
  1 enabled
When disabled, input Logical Addresses are output as Physical Addresses. Reset clears this bit.
SRE (Supervisor Root Pointer Enable) indicates if supervisor references are translated with the SRP.
  0 Supervisor Root Pointer disabled
  1 Supervisor Root Pointer enabled
If the SRP is disabled, then the (CRP) is used for supervisor translations.
FCL (Function Code Lookup) indicates if the top level table in the translation tree should be indexed with the Function Code when using the CRP or SRP.
  0 Function Code lookup disabled
  1 Function Code lookup enabled
If the Function Code lookup is suppressed, then the first lookup is made using bits from the Logical Address as the index. If the Function Code lookup is enabled, the LIMIT field of the root pointer used for translations is ignored. The Function Code lookup is always made when using the DMA Root Pointer for translations for an alternate bus master.
PS (Page Size) indicates the current page size the PMMU 20 is supporting:
  1000 256 bytes
  1001 512 bytes
  1010 1K bytes
  1011 2K bytes
  1100 4K bytes
  1101 8K bytes
  1110 16K bytes
  1111 32K bytes
Page Size bit 3 is always assumed to be a 1. A value of 0 in bit 3 of this field is reserved for future extensions. A write of 0 to bit 3 of this field via the PMOVE instruction will cause a Configuration Exception to be signaled.

IS (Initial Shift) determines how many upper Logical Address bits are ignored by the PMMU 20 during table walking. The value of this field is taken as an integer from 0 to 15 indicating the number of bits to discard from the Logical Address, starting with bit 31. This allows the PMMU 20 to easily adapt to systems using Logical Addresses of 17 to 32 bits.

TIx (Table Index x) specifies the number of bits of Logical Address to be used as an index into the tables at each level. In the preferred form, four table indexes are provided. The first lookup using Logical Address bits (which will be the second if the lookup on Function Code is not suppressed) uses TIA, the second TIB, etc. The value of the field is an unsigned integer from 0 to 15 that reprsents the number of bits to be taken from the Logical Address as an index. A 0 value in a TIx field implies that no further tables are to be used for this translation.

In general, TC contains control bits to set the page size, the number of levels in the translation tree, and the size of the table at each level. The IS (Initial Shift) field controls how many upper Logical Address bits are initially discarded by the PMMU 20 prior to a tablewalk, allowing the PMMU 20 to be easily adapted to systems with Logical Addresses smaller than 32 bits.

The four TIx fields, TIA (Table Index A), TIB (Table Index B), TIC (Table Index C), and TID (Table Index D), control how many bits of the Logical Address are used to index into the translation tables at each level of lookup. The PS (Page Size) field indirectly defines page size by controlling how many lower Logical Address bits are to be passed through as the page displacement. Since in the preferred form each Logical Address is comprised of 32 bits, the number of bits initially shifted plus the number of bits used to index into each of the tables plus the number of page displacement bits must equal 32 for proper address translation. Accordingly, whenever TC is written, the PMMU 20 performs a consistency check on the values of IS, TIx and PS, as shown in FIG. 3, and signals a Configuration Error to the Processor 14 if the sum is not equal to 32. If desired, one or more of the TIx fields may be zero. However, in such a case, all succeeding TIx fields must also be zero. Writing to TC also causes a flush of the ATC 26.

The Current Access Level (CAL) register contains the encoded access level of the current module. The register is 8 bits wide, but in the preferred form only the upper 3 bits are implemented. Unimplemented bits read as 0's. This register is automatically loaded by the CALLM and RTM instructions. It can also be loaded with the PMOVE instruction.

The Validate Access Level (VAL) register contains the access level of the caller of the current module. The register is 8 bits wide, but in the preferred form only the upper 3 bits are implemented. Unimplemented bits read as 0's. This register is automatically loaded with the contents of the CAL register by the CALLM instruction, and reloaded from the stack frame by the RTM instruction. It is also used by the PVALID instruction to validate parameters. It can also be loaded with the PMOVE instruction.

The Stack Change Control (SCC) register is an 8 bit register that determines if a stack change should occur during an CALLM instruction.

The Access Control (AC) register is a 16 bit register having the following format:

| 15 8 | 7 | 6 | 5 4 | 3 | 2 1 | 0 |
|---|---|---|---|---|---|---|
| UNUSED | MC | 0 | ALC | 0 | 0 | GS | wherein:

MC (Module Control), if set, enables module operation; if clear, modules are disabled, writes to IAL and DAL do not change CAL, and all reads of ALS return the illegal code. This causes all CALLM and RTM instructions to trap. Also, the PVALID instruction will always cause an exception.
0 disabled
1 enabled ALC (Access Level Control) determines the number of upper Logical Address bits used as access level information and whether access levels are enabled. The field is encoded as:
00 no address bits: access levels disabled
01 one address bit: 2 access levels, each 2^31 bytes
10 two address bits: 4 access levels, each 2^30 bytes
11 three address bits; 8 access levels, each 2^29 bytes
This field is initialized to 00 at Reset.

(Gate Size) designates the size of Gates and consequently, the boundary on which a gate is allowed to fall. The field is encoded as follows:
00 no gates are valid
01 gates are 16 bytes
10 gates are 32 bytes
11 gates are 64 bytes In general, the AC register is used to configure various access controls the PMMU 20 supports. The register controls whether access levels are enabled, how many upper address bits contain access level information (up to a maximum of 3), and also designates the size of a Gate and consequently the boundary on which a Gate is allowed to fall.

The Status (STATUS) register is a 16 bit register having the following format:

| 15 | 14 | 13 | 12 | 11 | 10 | 9 | 8 | 7 | 6 | 3 2 | 0 |
|---|---|---|---|---|---|---|---|---|---|---|---|
| B | L | S | A | W | I | M | G | C | | UNUSED | N | wherein:
B (Bus error) is set if a Bus Error is returned to the PMMU 20 during the table walk.
L (Limit violation) is set if an index exceeded a limit on the test; cleared otherwise.
S (Supervisor violation) is set if a Supervisor violation has been detected; cleared otherwise.
A (Access level violation) is set if the access tested exceeded RAL if it was a read, or exceeded WAL or RAL if it was a write; cleared otherwise.
W (Write protect) is set if the address is not writable; cleared otherwise.
I (Invalid) is set if the address has no translation in the table; cleared otherwise.
M (Modified) is set if the address is found in the cache and it has the M bit set.
G (Gate) is set if the address is a valid Gate address.
C is set if the address is marked globally sharable.
N (Number) is set to the number of tables used in the translation of an address.

In general, Status contains information pertaining to the status of the PMMU 20 and is only affected by the PTEST instruction. However, the bits interact in the following ways: if B is set, then I is set and L, S, A, G, and C are clear; or if
L is set then I is set and S, A, G, and C are clear. The different cases, when set, typically have the following implications:
B Bad pointer in table/main memory failure
L Addressing error by task/request for stack extension
S Attempt by user to execute supervisor code
A Attempt to exceed access level
W Attempt to write to protected memory
I Page fault 4. Access Protection:

The PMMU 20 provides mechanisms to protect code and data from unauthorized access, to allow code running at different access levels different privileges to memory, and to control changes in access level. In general, access levels provide a means to allow different portions of a user task different privileges to the Logical Address space. In the preferred form, the PMMU 20 will support 0, 2, 4, or 8 access levels. This is controlled by the ALC field of the AC register. The values set in this field have the following effects:
00 No access levels. No bus cycle privilege checking against CAL. No stack change requested on CALLM instructions.
01 2 access levels. Bit 31 of Logical Address, bit 7 of CAL, and bit 7 of VAL are the access level bits. Bit 0 of the SCC register is used.
10 4 access levels. Bits 31-30 of Logical Address, bits 7-6 of CAL, and bits 7-6 of VAL are the access level bits. Bits 0, 2, and 4 of the SCC register are used.
11 8 access levels. Bits 31-29 of Logical Address, bits 7-5 of CAL, and bits 7-5 of VAL are the access level bits. Bits 0-6 of the SCC register are used.

Each bus cycle run by the logical bus master is checked for sufficient privilege by the PMMU 20. This is done by comparing (unsigned) the access level bits of the Logical Address with the access level bits of the Current Access Level (CAL) register. If the incoming address bits are less than the CAL bits, by means of a numerical, unsigned comparison, and the Function Codes indicate a user space access, then the bus cycle is requesting a privilege that the routine does not have. In this case, the PMMU 20 terminates the bus cycle by asserting the BERR signal. If the reference is to Supervisor space, then this check is not performed. Note that a task can generate addresses that it does not have permission to use, and that there may be valid translations in the ATC 26 left from higher privilege routines. The checking guarantees protection in these cases.

The PMMU 20 includes support for module calls with the call module (CALLM) and return from module (RTM) instructions. Module calls are simply the means by which a module conducting an operation accesses, or in this case, attempts to access a module in memory. The CALLM instruction references a module descriptor. This descriptor contains control information for entry into the associated module. The CALLM instruction creates a module stack frame and stores the state of the calling module in that frame. The RTM instruction recovers the calling module's state from the module stack frame before returning to the calling module. The formats of the module descriptor and the module stack frame are described in copending application serial number 626,363, which is incorporated by reference herein. During execution of the CALLM instruction, the Processor 14 obtains the access level of the called module from the module descriptor; and later recovers the access level of the calling module from the module stack during execution of the RTM instruction. Although the Processor 14 typically does not interpret this access control information, it does communicate with the PMMU 20 when the access control is to be changed, and relies on the PMMU 20 to verify that the changes are legal. In the present invention, this communication is performed over a bus interface of limited width.

In general, the module mechanism supports a finer level of access control than that provided by the distinction between user and supervisor references. The module mechanism allows a module with limited access rights to call a module with greater access rights. With the help of the PMMU 20, the Processor 14 can verify that the calling module is allowed to increase its access rights, and can detect attempts by a calling module to gain access rights to which it is not entitled.

While executing CALLM or RTM instructions which reference access level change module descriptors or frames, the Processor 14 communicates with the PMMU 20 access control logic via accesses in the CPU Space. If a Bus Error occurs on any of these CPU Space accesses during the execution of a CALLM or RTM instruction, the Processor 14 will take a Format Error exception.

In operation, the Processor 14 may determine the access rights of the current module by reading the Current Access Level (CAL) bus register. The Increase Access Level (IAL) bus register is used by the Processor 14 to request increased access rights. The Decrease Access Level (DAL) bus register is used by the Processor 14 to request decreased access rights. The formats of these three bus registers are undefined to the Processor 14, but the Processor 14 assumes that information read from the CAL bus register can be meaningfully written to the IAL or DAL bus registers. The Access Level SStatus (ALS) bus register allows the Processor 14 to query the PMMU 20 as to the legality of intended access level transitions as follows:

| Value | Validity | Processor 14 Action |
|---|---|---|
| 00 | Invalid | Format Error |

| Value | Validity | Processor 14 Action |
|---|---|---|
| 01 | Valid | No Change in Access Rights |
| 03 | Valid | Change Access Rights only |
| 07 | Valid | Change Access Rights and Stack Pointer |
| Other | Undefined | Undefined |

The Processor 14 uses the Descriptor Address (DA) bus registers during the CALLM to communicate the address of the module descriptor. This allows the PMMU 20 to verify that the address is a valid address for the descriptor. This also prevents a module from creating an access level change descriptor to surreptitiously increase its access rights.

In general, the CALLM instruction is used to make both access level change and non-access level change module calls. For the latter type module calls, the Processor 14 simply creates and fills the module stack frame at the top of the active system stack. The calling module's condition codes are saved in an appropriate field of the frame. Depending upon certain control information, the Processor 14 may or may not save the calling module's stack pointer. The Processor 14 will however use the module entry word to save and load the module data area pointer register, before beginning execution of the called module.

For the access level change type of module descriptor, the Processor 14 must first obtain the current access level from the PMMU 20. It also verifies that the calling module has the right to read from the area pointed to by the current value of the stack pointer. It then passes the descriptor address, and the new access level to the PMMU 20 for validation. The Processor 14 then reads the access status to determine the decision of the PMMU 20 as to the validity of the requested access level change. If the PMMU 20 determines that the change in access level should not be granted, the access status is zero, and the Processor 14 takes a Format Error exception. No visible Processor 14 registers are changed, nor will the PMMU 20 change the current access level. If the PMMU 20 determines the change should be granted, the PMMU 20 changes the current access level, and allows the Processor 14 to proceed. If the access status requires a change in the stack pointer, the Processor 14 loads the new value from the module descriptor and copies any arguments from the calling module's stack to the new stack. Finally, the Processor 14 creates and fills the module stack frame on the top of the new stack. The calling module's condition codes are saved in an appropriate field of the frame. Execution of the called module begins as with the non-access level change type of module descriptor.

The RTM instruction is used to return from a module. For the non-access level change type of module stack frame, the Processor 14 reloads the condition codes, the Program Counter, and the module data area pointer register from the frame. The frame is then removed from the top of the stack, the argument count is added to the stack pointer, and execution returns to the calling module.

For the access level change type of module stack frame, the Processor 14 reads the access level, condition codes, Program Counter, saved module data area, and saved stack pointer from the frame. The old access level is written to the PMMU 20 for validation. The Processor 14 then reads the access status to determine the decision of the PMMU 20 as to the validity of the requested access level change. If the PMMU 20 determines that the change in access level should not be granted, the access status is zero, and the Processor 14 takes a Format Error exception. No visible Processor 14 registers are changed, nor will the PMMU 20 change the current access level. If the PMMU 20 determines that the change should be granted, the PMMU 20 changes the current access level and allows the Processor 14 to proceed. The Processor 14 then loads the values from the module stack frame into the corresponding registers, adds the argument count to the new stack pointer value, and returns to the calling module.

If the called module does not wish the module data pointer to be loaded into a register, the RTM instruction word can so indicate, and the loaded value will then be overlaid with the correct stack pointer value.

During the execution of the CALLM instruction, the Processor 14 and the PMMU 20 have quite distinct responsibilities. Initially, the Processor 14 must retrieve the current value in the CAL register via the CAL bus register, and store it in the module stack frame for later use. In the preferred form, the PMMU 20 returns bits 7-5 of the CAL register in bits 7-5 of the CAL bus register, and bits 7-5 of the VAL register in bits 3-1 of the CAL bus register.

Next, the Processor 14 must write the address of the module descriptor of the called module to the appropriate one of the eight DA bus registers. When a value is written to one of the DA bus registers, the Logical Address made up of the contents of the DA bus register and the Function Code associated With that DA bus register is looked up in the translation tables and/or translation cache. Normally a cache entry should be located for the address since the CALLM instruction has already read the first word of the called module to obtain the type and access level information. However, if a cache entry is not located, a table search is made and an entry inserted in the cache. If a translation cannot be located in the tables, the call is disallowed. An address is valid for a Gate if the page it is in is permitted to contain Gates (has the G bit set in the descriptor), and if the address is equal to 0 modular Gate Size (Gate Size is determined by the GS field of the AC register). The success or failure of the descriptor check is retained by the PMMU 20 for use in returning an access status value.

Next, the Processor 14 requests the PMMU 20 to update the CAL register by writing the new access level to the IAL bus register. In the preferred form, the PMMU 20 compares (unsigned) the value written to the IAL bus register against the access level bits of the CAL register. If IAL is greater than CAL, then the access level check fails. If IAL is less than CAL and the Gate bit for the page containing the module descriptor of the called module is set, then the change is allowed. If IAL is equal to CAL, the access level check passes. CAL is copied to VAL, and IAL is placed in CAL. The success or failure of the access level change is retained by the PMMU 20 for use in returning an access status value.

Information about stack changes is contained in the SCC register. At a successful increase in access privilege, the bits in the SCC register with bit position numbers less than the current access level and greater than or equal to the new access level are examined. If any of these bits is a one, a stack change is indicated. The need or lack of need for a stack change is retained internally for use in returning an access status value.

The final action performed by the Processor 14 in a CALLM sequence is to read the PMMU 20's ALS bus register to obtain the access status. The value returned is as defined above.

In a RTM instruction, the Processor 14 writes the old (saved) access level to the PMMU 20's DAL bus register. It then checks the status of the access level change. When a value is written to the DAL bus register, the PMMU 20 compares (unsigned) the access level bits against the access level bits of the CAL register. In one embodiment of the invention, if the DAL field is greater than or equal to the CAL field, the change is allowed and bits 7-5 of DAL are placed in CAL, and bits 3-1 of DAL are placed in VAL. If the DAL field is less than the CAL field, the change is not allowed. The success or failure of the access level change is retained by the PMMU 20 for use in returning an access status value.

The final action performed by the Processor 14 in a RTM sequence is to read the PMMU 20's ALS bus register to obtain the access status. The value returned is as defined above.

In the preferred form, the PMMU 20 provides additional access protection. For example, an indication of write protection is stored at each level of the translation tree. A page is considered to have this attribute if any table at any level has the Write Protect (WP) bit set.

The effective write protection of a page is determined by logically ORing the WP bits of each descriptor fetched during the table walk, and checking the read and write access level bits of the address against the respective RAL and WAL fields (if access levels are enabled). At the end of the table walk, if the page is effectively write protected, an entry is made for the Logical Address in the descriptor cache with the WP bit set.

A page may be locked or contain a Gate only if the corresponding bit is set at the lowest level of the table. The indication of modified and cache inhibit are also only present at the lowest level of the table.

For finer control on the rights associated with a page, long descriptors may be used to limit accesses on the basis of user/supervisor, and eight levels of privilege are available for both read accesses and write accesses to provide an efficient hierarchical protection mechanism. If access rights violations are detected during the table walking process, an entry is formed from the incoming Logical Address, and the BERR or WP bit is set in the ATC 26 entry for read access violations and write access violations respectively. Subsequent accesses to this Logical Address will cause the assertion of the BERR pin if a hit occurs in the ATC 26 with the entry's BERR bit set, or if a write attempt occurs with the WP bit set.

5. Translation Tables:

In the preferred form, the translation tables are structured as a tree. This tree structure reduces the size of the page tables that need to be set up for most programs, since only a portion of the complete tree needs to exist.

There are two types of translation tables: pointer tables, and page tables. Pointer tables form the branches of the translation table tree, while page tables are the leaves. The tables are composed of descriptors. The format is similar for both page and pointer descriptors, consisting of an address field and a control/status field. In general, the address field of a page descriptor is used to define the Logical to Physical Address mapping of a page, while the address field of a pointer descriptor is used to point at other translation tables in the tree.

The Root Pointer descriptor is used to point to the root of a translation tree. This type of descriptor is used only in the Root Pointer registers. Translation trees may exist on a per-task basis, or be shared among tasks depending on whether the CPU Root Pointer (CRP) descriptor is changed on a context switch. In addition, translations performed for an alternate bus master use a translation tree pointed to by the DMA Root Pointer (DRP). If desired, supervisor accesses may be translated using a different translation tree than that pointed to by the CRP by utilizing the Supervisor Root Pointer (SRP).

Each Root Pointer has the following format:

```
31    30   16 15     0 31         4 3      0
| L/U | LIMIT | STATUS | ADDRESS | UNUSED |
``` wherein STATUS:

```
15-13  12-10  9   8   7   6   5   4   3   2   1-0
| RAL | WAL | SG | S | G | CI | L | M | U | WP | DT |
```

In the case of an Invalid Root Pointer descriptor, performing translations is not possible, so a Configuration Error exception is signaled when the register load is attempted. If the Root Pointer is a Page Descriptor, the Logical Address will be passed through the PMMU 20 as the Physical Address. The Valid Short and Valid Long types indicate a valid Root Pointer, and also indicate the length of the descriptors in the table at the next level. Note that use of the DRP always implies a lookup by Function Code at the first level table, and the L/U bit and Limit fields are not used when a lookup by Function Code is performed using any Root Pointer.

The PMMU 20 design specifies several different table descriptor types. All descriptors have one element in common: bits 0 and 1 of the first long word of all types are the DT field of the descriptor. The value of these bits affects the meaning of the other bits of the descriptor.

The format of a descriptor is determined by three things: the value of the DT field of the previous descriptor, the value of the DT field of the descriptor, and the state of the table search. The value of the previous DT field determines whether the current descriptor is of the long or short form. The other 2 items determine its type according to the following table:

|  | Current Table Search State | | |
|---|---|---|---|
| Current DT field | More TI fields to use | TI fields used up | Indirect |
| INV | Invalid | Invalid | Invalid |
| PD | Type 2 Page Desc. | Type 1 Page Desc. | Type 1 Page Desc. |
| SHORT | Pointer | Indirect | Invalid |
| LONG | Pointer | Indirect | Invalid |

The Short Pointer descriptor has the following format:

```
31                    4 3      0
| TABLE ADDRESS | STATUS |
``` wherein STATUS:

```
3   2   1   0
| U | WP | DT |
```

The long Pointer descriptor has the following format:

```
31   30  16 15    0 31          4 3      0
| L/U | LIMIT | STATUS | TABLE ADDRESS | UNUSED |
``` wherein STATUS:

```
15-13  12-10  9   8  7  6  5  4   3   2   1   0
| RAL | WAL | SG | S | 0 | 0 | 0 | 0 | U | WP | DT |
```

In the preferred form, there are two types of Page descriptors: Type 1 which occurs only in page tables, and Type 2 which occurs only in pointer tables. Thus, as shown in FIG. 4, the presence of a Type 2 Page descriptor in a pointer table indicates that the table searching is to end before all of the TI fields are used. Even though no further table entries are fetched, the next TI field in sequence is compared against the Limit field. If the check fails, then a translation cache entry is made for the Logical Address with the BERR bit set.

The Type 1 Short Page descriptor has the following format:

```
31              8 7         0
| PAGE ADDRESS | STATUS |
``` wherein STATUS:

```
7   6   5   4   3   2   1   0
| G | CI | L | M | U | WP | DT |
```

The Type 1 Long Page descriptor has the following format:

```
31    16 15     0 31           4 3      0
| UNUSED | STATUS | PAGE ADDRESS | UNUSED |
``` wherein STATUS:

```
15-13  12-10  9  8  7   6  5  4   3   2   1   0
| RAL | WAL | SG | S | G | CI | L | M | U | WP | DT |
```

The Type 2 Short Page descriptor has the following format:

```
31              8 7         0
| PAGE ADDRESS | STATUS |
``` wherein STATUS:

```
7   6   5   4   3   2   1   0
| G | CI | L | M | U | WP | DT |
```

The Type 2 Long Page descriptor has the following format:

```
31   30   16 15    0 31          4 3    0
| L/U | LIMIT | STATUS | PAGE ADDRESS | UNUSED |
``` wherein STATUS:

```
15-13 12-10 9  8  7  6  5  4  3  2  1  0
| RAL | WAL |SG|S| G|CI| L| M| U|WP|DT|
```

Invalid descriptors hold places in tables for data that is either paged out or not allocated.

The Short Invalid descriptor has the following format:

```
31           2 1  0
|   UNUSED   | DT |
```

The Long Invalid descriptor has the following format:

```
31           2 1  0 31           0
|   UNUSED   | DT |    UNUSED    |
```

Indirect descriptors add an additional level of lookup so that individual pages may be shared among tasks with only one set of history bits for the page.

The Short Indirect descriptor has the following format:

```
31                     2 1  0
|   DESCRIPTOR ADDRESS  | DT |
```

The Long Indirect descriptor has the following format:

```
31       2 1 0 31                 0
| UNUSED |DT | DESCRIPTOR ADDRESS |UN.|
```

In the various descriptors, the bits and fields are defined as follows:

L/U (Lower/Upper) indicates whether the pages of this area of memory occupy the lowest available addresses or the highest. This causes the compare of the limit field against the portion of the Logical Address being used to index into the tables to be made as follows: If L/U =0, the Limit field contains an upper (unsigned) limit on the index, so the index must be <=Limit. If L/U=1, then the Limit field contains a lower limit on the index, and the index must be >=Limit. If the index is out of bounds then a translation cache entry is made for the Logical Address with the BERR bit set. Otherwise the table search continues. (See, FIG. 5).

LIMIT indicates the maximum or minimum value for the index into the next level of table. This field is used to limit the size of the table at the next level. See the L/U bit above.

RAL (Read Access Level) indicates the access level of the Logical Address required to access an area of the Logical Address space. It is encoded as follows:
000 Access Level 0 or Supervisor
001 Access Levels 1->0 or Supervisor
010 Access Levels 2->0 or Supervisor
011 Access Levels 3->0 or Supervisor
100 Access Levels 4->0 or Supervisor
101 Access Levels 5->0 or Supervisor
110 Access Levels 6->0 or Supervisor
111 Access Levels 7->0 or Supervisor Access levels with a smaller (unsigned) encoding are more privileged than those with a higher (unsigned) encoding. An encoding of 100 requires more privilege to access a descriptor or page than an encoding of 101. When a descriptor is loaded and the access is a User space access, the number of upper Logical Address bits indicated by the ALC field in the AC register are compared against the RAL field of each long descriptor in the tree walk. If any RAL indicates that the access should be denied, then a descriptor is formed and loaded into the ATC 26 with its BERR bit set.

WAL (Write Access Level) indicates the access level required to write to an area of the Logical Address space. It is encoded as follows:
000 Access Level 0 or Supervisor
001 Access Levels 1->0 or Supervisor
010 Access Levels 2->0 or Supervisor
011 Access Levels 3->0 or Supervisor
100 Access Levels 4->0 or Supervisor
101 Access Levels 5->0 or Supervisor
110 Access Levels 6->0 or Supervisor
111 Access Levels 7->0 or Supervisor When a descriptor is loaded and the access is a user space write access, the number of upper Logical Address bits indicated by the ALC field in the AC register are compared against the WAL field of every long descriptor used in the table walk. If any WAL indicates that writing is not permitted with this address, then the descriptor is loaded with the WP bit set.

S (Supervisor) indicates whether the address is restricted as to the Function Code that can be used:
0 Any Address Space References
1 Supervisor Space References Only SG (Shared Globally) indicates whether this area of the Logical Address space is shared among all tasks in the system or not. If the area is shared, only one entry will be made in the ATC 26 and all tasks will share it. The bit is defined as follows:
0 not shared
1 shared G (Gate) is set if the page may contain Gates; cleared otherwise.

CI (Cache Inhibit) is used in systems with data caches to mark pages which should not be cached, to avoid stale data problems. The PMMU 20 presents this bit to the external system during translations.

L (Lock) is set to lock a descriptor into the ATC 26, making it unavailable for replacement. The ATC 26 entry must be flushed to unlock the descriptor. However, the Root Pointer Table may have interactions with locking descriptors.

M (Modified) is set if the page has been written to; cleared otherwise. The PMMU 20 sets M if it was previously clear and a write occurs to the page of this descriptor. This bit is never cleared by the PMMU 20.

U (Used) is set if the descriptor address field has been used to access a page or table; cleared otherwise. This bit is set by the PMMU 20 if it was previously clear and the descriptor address field was used by the PMMU 20 during the translation process. This bit is never cleared by the PMMU 20.

WP (Write Protected) is set if the page is absolutely write protected; cleared otherwise. A descriptor is formed with its WP bit set and is loaded into the ATC 26. An entry may be conditionally write protected by the WAL field described above. An attempted write to a write protected page causes the PMMU 20 to abort the translation by asserting BERR.

DT (Descriptor Type) indicates the type of descriptor. It occurs in the same position in a descriptor regardless of type. It is used with the value of the previous DT field and the state of the table search to determine the descriptor format.

00 INVALID: A descriptor with this DT value is always invalid. This may indicate that the page or table is not resident (paged out) or the Logical Address is out-of-bounds. When an invalid descriptor is encountered, a translation cache entry is made for the Logical Address with the BERR bit set.

01 PAGE DESCRIPTOR: This value is used to terminate the table walking procedure. It indicates either a type 1 or type 2 Page descriptor. When a page descriptor is encountered, the table walking process terminates, and an entry is made for the Logical Address in the ATC 26. The Physical Address field for the entry is formed by adding the remaining Logical Address bits (those that haven't been used as an index into a table previous levels) zero extended to the Page Address field of the descriptor. (See, FIG. 4).

10 SHORT: This value indicates that the next descriptor to be fetched is of a short format. It may occur in a Pointer descriptor (short or long) or in an Indirect descriptor (short or long). When this value occurs in a Pointer descriptor, it means that the Table address field points to a table of short descriptors and that the index should be multiplied by 4. When a SHORT value is encountered and the Logical Address has been exhausted (all TI fields used), this value indicates an Indirect type descriptor which points to a short descriptor.

LONG: This value indicates that the next descriptor to be fetched is of a long format. It may occur in a Pointer descriptor (short or long) or in an Indirect descriptor (short or long). When this value occurs in a Pointer descriptor, it means that the Table address field points to a table of long descriptors and that the index should be multiplied by 8. When a LONG value is encountered and the Logical Address has been exhausted (all TI fields used), this value indicates an Indirect type descriptor which points to a long descriptor.

TABLE ADDRESS consists of 28 bits and always points to the base of a table of descriptors.

PAGE ADDRESS contains the Physical Address of a page (the page frame number). It consists of 24 bits, however not all of these bits may be used. If the page size is larger than 256 bytes not all of the bits will be required. Specifically the lower (value of PS field of TC register) minus 8 lower order bits of this field will be unused. For example, for a page size of 1024 bytes, the value of the PS field is 10 (1010 binary) so the lowest 10-8=2 bits of the Page Address field are not used. The unused bits may be used by software.

INDIRECT ADDRESS consists of 30 bits that points to an individual descriptor. If the DT field indicates LONG, then the low order bit of this field must be 0.

UNUSED bits are unused by the PMMU 20.

6. Table Walking:

The PMMU 20 fetches a descriptor by performing successive table lookups until a page descriptor is found (or an exception condition occurs). These table lookups are performed by using portions of the Logical Address to index into a table of descriptors at each level in the translation tree. The base of the table is pointed to by the descriptor obtained in the previous table one level up in the tree. The maximum size of a table is determined by the number of Logical Address bits being used as an index into the table as well as by the size of the descriptors in the table. Tables may be limited to sizes smaller than this maximum via a limit field in certain descriptors. Once a descriptor is obtained from a table, it is checked for validity. If it is valid, it determines the type of descriptor at the next level of the tree. This lookup process continues using pieces of the remaining Logical Address until a page descriptor is obtained, or an exception occurs. Once a page descriptor is obtained, the logical to physical mapping has been defined for that page.

When DMA accesses are being translated using the DMA Root Pointer (DRP), the first level table is always indexed by Function Code. If the Supervisor Root Pointer (SRP) or the CPU Root Pointer (CRP) is being used for translation and the FCL (Function Code lookup) bit of the TC register is set, then the first level lookup is indexed by Function Code. If the FCL bit is clear, then no Function Code lookup is performed and the first lookup is as described in the next paragraph. This table walk procedure is shown in FIG. 3. The page descriptor is fetched as follows: if bit 3 of the Function Code FC[3]was not asserted then the incoming value of FC2-0 is used to index into the table pointed to by the CRP or SRP register. If FC[3]was being asserted by a device other than the PMMU 20 when the ATC 26 miss occurred, bits 2-0 of the Function Code FC[2-0]are used to index into the table pointed to by the DRP. A descriptor is then fetched from the upper level table. The type of descriptor to be fetched is determined by the descriptor type field in the root pointer used. Provided the fetched descriptor is valid, the address field of the descriptor is used to form the upper bits of a pointer to the next level of translation.

The number of upper Logical Address bits indicated by the IS field of the TC register are discarded by the PMMU 20. The number of bits indicated by the TIA field are taken from the upper portion of the Logical Address. These are treated as an unsigned integer. If the DT field of the current descriptor (or root pointer, if this is the first level) indicates that the descriptor at the next level of the tree is a short descriptor (32 bits), then the Logical Address bits are shifted left by 2 and added to the address field of the fetched descriptor. If the DT field indicates that the descriptor at the next level of the tree is a long descriptor (64 bits), then the Logical Address bits are shifted left by 3 and added to the address field of the fetched descriptor. This pointer is used to fetch the descriptor at the next level of the tree.

This procedure continues, using the address field of this new descriptor, the next TIx field, and the next upper Logical Address bits to fetch another descriptor; and so on, until a page descriptor is fetched, or there are no more TIx fields, or the next one is zero (or the table walking procedure aborts, as discussed later).

If a descriptor is long, the base address of the next level table is taken to be bits 31-4 of the second long word. Bits 3-0 are ignored and may be used by the user for status or other functions (they are zero filled for address calculations). If a descriptor is short, the base address of the next level table is taken to be the single long word with bits 3-0 (the status bits) zero filled. The portion of the Logical Address indicated by TIx which has been shifted left to point to a descriptor boundary is added to the base address of the table to locate the next descriptor. Because there are only 28 bits of address information in the descriptor, address calculations fill the low order 4 status bits of a descriptor address field with zeros.

Figure 6:
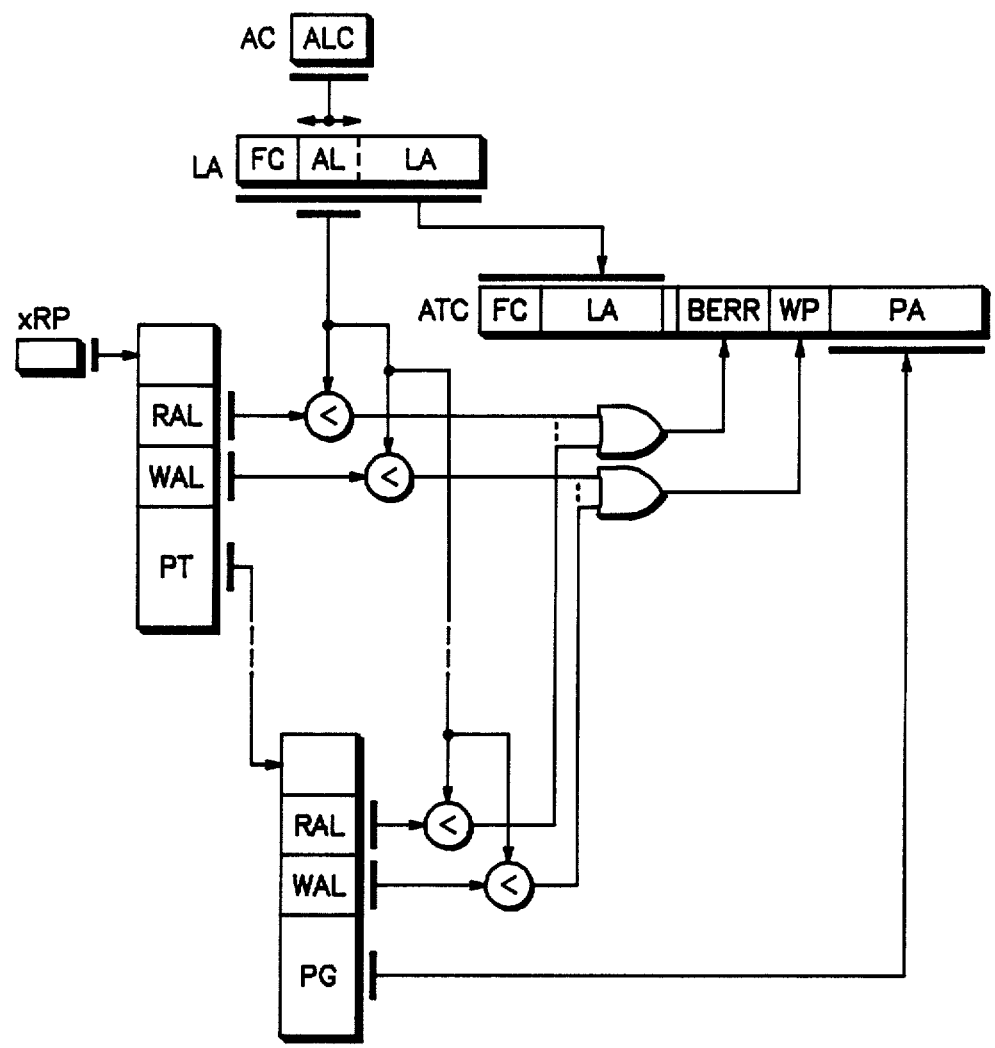
FIG. 6 illustrates how the PMMU of FIG. 2 determines violations of access permission during the table walking procedure of FIG. 3.

If the ALC field of the AC register contains a non-zero value, enabling access level control, the PMMU 20 will evaluate access permissions at each level of the translation table containing a long descriptor and accumulate the results. As shown in FIG. 6, the PMMU 20 will compare the RAL and WAL fields in each long descriptor against the number of high order logical address bits denominated by the value of the ALC field as containing the effective access level of the current bus cycle. If the effective access level is determined to be logically less than the RAL field in any long descriptor encountered during the table walk, the BERR bit is set in the translator stored in the ATC 26 to indicate that task is not permitted to read from the page at that logical address. Similarly, if the effective access level is determined to be logically less than the WAL field in any long descriptor encountered during the table walk, the WP bit is set in the translator stored in the ATC 26 to indicate that task is not permitted to write to the page at that logical address. Since the PMMU 20 considers access privilege to be inversely related to the numeric value of the access level, a specified value in a RAL or WAL field which is numerically less than an effective access level value will be considered as an access privilege violation. By using the BERR and WP bits in the ATC 26 to indicate access privilege violation as well as an error in translation or a wholly write protected page, respectively, the width of the ATC 26 is minimized. Similarly, the evaluation of access permission during table walking eliminates the need to save the most-restrictive RAL and WAL values in the ATC 26, while at the same time minimizing the time required to evaluate access privilege during actual address translations. On the other hand, if a particular task is so structured that the same logical address must be accessed at different effective access levels, the PMMU 20 will load a different translator in the ATC 26 for each access level (since the full logical address including the effective access level bits will be different), but the BERR and WP bits may be set differently depending upon the evaluated access permissions for the respective effective access levels.

The table walking procedure may deviate from the normal case described above for a number of reasons:

(1) If the Used and/or Modified bits of a descriptor are not set, then the PMMU 20 will set them appropriately, and then update the status byte of the descriptor. If the descriptor being updated already has the Modified bit set, then the update is done using a single read-modify-write cycle. Otherwise, a simple write is used;

(2) If the FCL bit of the TC register is clear, then the first lookup is by Logical Address; or (3) If a page descriptor is encountered during the table walk, the walk terminates, and an entry is made for the Logical Address in the ATC 26. The Physical Address field for the entry is formed by adding the remaining number of Logical Address bits (those that haven't been used as an index into a table at some previous level), zero extended, to the Physical Address field of the descriptor with the lower PS bits zero filled. After the entry is made and the PMMU 20 relinquishes the bus, the bus cycle may be retried.

7. ADDRESS TRANSLATION CACHE:

To avoid the overhead of walking the translation tables on each access, recently used logical-to-physical translators are held in the ATC 26. The ATC 26 is designed to provide a high hit rate and fast translation time. When the ATC 26 misses, the PMMU aborts the current bus cycle with an indication to the bus master that the cycle should be retried later. The PMMU 20 then arbitrates for the Logical and Physical buses, and searches the translation tables in memory to find the correct page descriptor. This descriptor is then used to build a translator in the ATC 26. When the PMMU 20 relinquishes the buses, the old bus master can arbitrate, and retry the aborted bus cycle. This time the PMMU should "hit" in the ATC 26 and the bus cycle can proceed normally.

In the ATC 26, each cache entry has a logical section (tag) and a physical section (information corresponding to the tag). However, the logical contents of entries are not user visible. The 31 bit logical section of each entry is comprised of the following fields:

| 31 | 30 28 | 27 24 | 23           0 |
|----|-------|-------|----------------|
| V  | TA    | FC    | LOGICAL ADDRESS | wherein:

V (Valid) is 1 if the entry contains a valid translator; cleared otherwise. This bit is set when a translator is loaded into the entry. It is cleared by a PFLUSH or PFLUSHR instruction that matches a translator, by a PLOAD instruction that matches a translator, by a flush caused by reassignment of a Root Pointer Table entry on a PMOVE to CRP, and at Reset.

TA (Task Alias) provides a mechanism for differentiating between different tasks' accesses to an otherwise identical Logical Address. Combining the Task Alias information with the ability to perform a maskable clear of entry Validity bits (maskable flush of translators) gives the PMMU 20 the ability to keep multiple tasks' translators resident in the ATC 26 simultaneously. If a Task Alias must be reissued to a different task, all translators which contain that Task Alias are first flushed. This insures that the new task will not erroneously use the previous task's translators and eliminates the necessity of flushing the entire ATC 26 on a context switch. Comparing against this field will be suppressed if the table search that loaded this translator encountered a descriptor with a set SG bit. This implements the global sharing operation.

FC (Function Code) contains the Function Code bits FC[3:0]of the bus access which caused the translator to be loaded.

LOGICAL ADDRESS contains the Logical Address bits LA[31:8]of the bus access which caused the translator to be loaded. If the page size is greater than 256 bytes, some lower order LA bits in this 24 bit field will be "don't cared" during the address comparison made during normal translation.

The 30 bit physical section for each entry is comprised of the following fields:

```
 29  28   27   26   25 24 23                    0
| L |BERR| CI |WP | M | G| PHYSICAL ADDRESS    |
``` wherein:
- L (Lock) will be set if the cache entry is not available for reuse; cleared otherwise. If the ATC 26 is full of Valid translators, a currently valid translator must be overwritten on a translator load. If L=1, the cache entry is not available for reuse. If all entries but one become locked, the LW bit in the CS register will be set to indicate this condition. No further locking of translators will be done, regardless of the presence of a "lock" indication in a descriptor, to avoid totally filling the cache with locked translators. Until translators are flushed, the ATC 26 will continue to use the same (unlocked) entry for new translators on all cache misses. For this reason, the operating system must be careful to not lock in so many translators as to reduce the effectiveness of the translation mechanism. A locked translator may be invalidated if it was loaded using the CRP. If a new entry is made in the RPT, all translators in the ATC 26 with a matching TA field will be invalidated regardless of the state of their L bits. Translators loaded with the SRP or DRP are not invalidated in this way.
- BERR (Bus Error) will be set if an error was detected in the table search which resulted in this translator; cleared otherwise. If BERR=1, the PMMU 20 will assert the BERR output when the page is accessed. No PAS is generated. This provides the mechanism for signaling the current bus master, upon the retry access of a previously faulting (non-resident in the ATC 26) location, that no translation exists in the tables for this address. This also provides a mechanism to avoid redundant table lookup attempts to a nonresident location by other bus masters. The BERR bit may not be explicitly cleared. The Bus Error handler routine should include a PLOAD of the faulting address after the tables have been updated. The PLOAD will cause the PMMU 20 to flush any matching translators in its cache and then load the cache with the new data from the tables.
- CI (Cache Inhibit) indicates if accesses within the page are to be inhibited from being stored in a data cache. If CI=1, the PMMU 20 will assert the CLI output, when the page is accessed, concurrent with the bus cycle such that a Cache Controller will know not to attempt a "fill" when that bus access "misses" in the cache. Some typical types of accesses which would fall under this category are I/O accesses, accesses to a temporary buffer area, or accesses to a mailbox area.
- WP (Write Protect) reflects the "effective" write protection of a page. If WP=1 write accesses to the page are not legal. The effective write protection is the OR of all the WP bits encountered (one at each level) during a table walk, and the check performed on any WAL fields encountered. Note that this may be different than the actual value of the WP bit in the translation table page descriptor. If a write is attempted using a translator in the ATC 26 which has its WP bit set, no PAS will be generated and BERR will be asserted. The same is true for read-modify-write cycles (RMC) executed by Processor 14 which utilize an RMC signal. If, however, the Processor 14 does not have a RMC output, the read portion of the bus cycle will be translated in the normal fashion and a Write INhibit (WIN) output will be asserted if appropriate. When the Processor 14 R/W signal transitions to indicate the Write portion of the read-modify-write cycle, the WIN signal should block transition of the Physical R/W signal and the PMMU 20 will detect the write violation, negate PAS and assert BERR.
- M (Modified) is set if the page has been modified; cleared otherwise. If a write occurs to a writeable page which does not have the M bit set in the translator, the PMMU 20 will issue a "Relinquish & Retry" to the current bus master. After receiving the bus, the PMMU 20 will walk the tables, set the modified bit of the appropriate descriptor in the tables, invalidate the old translator, load a new translator with its modified bit set, and then relinquish the bus. When the previous bus master retries the write cycle, the PMMU 20 will find the M bit set and will provide the Physical Address and PAS in the normal fashion. In this manner, the Modified bit of a descriptor is set in the page tables upon the first write to that page, whether the translator is cached from a previous read or not.
- G (Gate) indicates whether or not this page can contain Gates. If G=1, the page is one which may contain gates for transition between different privilege levels. On a write to a Descriptor Address bus register, the PMMU 20 checks to see that the page indicated by that address has the G bit set. If this page does not have the attribute of containing gates (G bit set) then an appropriate error code is logged in the ALS register.
- PA (Physical Address) contains bits 31-8 of the Physical Address PA[31:8] formed from the page descriptor of the table lookup. If the page size is greater than 256 bytes not all of the stored 24 Physical Address bits are driven onto the external physical bus during translation. The Physical Address bits which address an area within a page are multiplexed such that the corresponding Logical Address bits are passed directly through to the external physical bus.

When the PMMU 20 performs a Reset operation, it "comes up" with the ATC 26 disabled (E bit of TC register clear). Logical Addresses are passed through directly, to be output on the Physical Address bus as a "transparent translation". This is necessary so that the reset vectors may be read from memory and the translation tables set up. In addition, access level checking is disabled, such that no accesses will generate a fault due to "attempts to exceed the current access level". After the tables are set up, the E bit may be set to enable ATC 26 operation.

If the PMMU 20 is not performing another operation and the ATC 26 is enabled, it is in the "Translation Lookaside" mode of operation. In this mode, the ATC 26 performs an ongoing comparison between logical information provided by the current bus master and the corresponding logical information stored in the tag area of each ATC 26 entry. The current bus cycle logical information is comprised of an incoming Logical Address, an incoming Function Code, and the current Task Alias (index of the current CRP value in the Root Pointer Table). There are corresponding fields in the tag area of each ATC 26 entry. If the current information matches the information stored in a valid translator, the ATC 26 is said to "hit". Those translators having the SG bit set will have the comparison between the Task Alias fields "Don't Cared" to allow sharing of translators.

If there is a hit, the ATC 26 will gate the stored Physical Address corresponding to the matched Logical Address to the PA output buffers, while gating the corresponding physical access information to other evaluation circuitry or output buffers. If the physical bus has been arbitrated away from the PMMU 20, then the PMMU 20 will not drive the physical bus until it becomes the physical bus master again. All of the access rights checking circuitry and associated control signals still operate regardless of the identity of the current physical bus master. In this manner, it is possible for there to be logical bus activity, which has access rights and exception checking performed, in parallel with totally disassociated physical bus activity. For instance, the Processor 14 may be running bus cycles out of a data cache which resides on the logical bus, and have its access rights monitored by the PMMU 20, in parallel with the operation of a DMA device which has arbitrated the physical bus away from the PMMU 20.

The physical information from a "hitting" translator in ATC 26 is routed as follows;
(1) BERR, WP, M, and G bits to access rights checking circuitry;
(2) Physical Address bits and Cache Inhibit bit to output buffers.

If discrete access levels are implemented, the access level of a particular bus cycle will be encoded, depending on the number of access levels, in Logical Address bits LA[31:29], LA[31:30], or LA[31]. These bits are compared in the same manner as are the other address bits to determine translator match, such that usage of discrete access levels is not an ATC 26 functional requirement. A separate comparison is made, in parallel with the ATC 26 lookup, between high order address bits and the enabled bits in the CAL register. If the access level encoded in the address exceeds the access level stored in the CAL register, then an exception exists and BERR is asserted to terminate the current access attempt. Supervisor accesses are an exception to this rule, as all supervisor accesses disable the CAL checking mechanism.

The "decision timeout" circuitry specifies by which clock edge after LAS has been detected (Asynchronous mode) or asserted (Synchronous mode) that the PMMU 20 will have had sufficient time to decide which external control signals to assert. The decision timeout clock edge must occur after an amount of time which will guarantee that the output of the access rights checking, exception detection, and ATC 26 matching circuitry will be valid at their destinations. If the access rights checking, exception detection, or ATC 26 matching circuitry does not resolve by this decision time, then the PMMU 20 may make an erroneous response (assert the wrong control signals). The decision tim may be increased from its minimum value at Reset/configuration time.

If there is a hit, no access rights violations, and no exceptions detected, PAS will be asserted at the "minimum PAS assert time" (dependent on translation mode) plus any delay specified at Reset/configuration time. PAS will be driven until the negation of LAS at which time it will drive inactive. When the PMMU 20 is physical bus master, the Physical Address bus is always driven and will be valid, while Logical Addresses and Function Codes are valid after access time requirements are met.

If there is no hit, or access rights have been exceeded, or an exception has occurred, the PMMU 20 will not generate PAS. Instead, the PMMU 20 will assert the control signals appropriate to the condition on the "timeout" clock edge. Exception conditions or access rights violations detected during normal lookaside operation which will cause generation of responses other than Physical Address and PAS are:
(1) PMMU Coprocessor register accesses decoded from the logical bus cause the encoded instruction to be performed;
(2) Access which attempts to exceed the stored "Current Access Level", if enabled causes the assertion of BERR;
(3) BERR bit set causes the assertion of BERR;
(4) Write access to a write protected page causes assertion of BERR;
(5) No hit in ATC 26 causes generation of Relinquish & Retry operation control signals;
(6) Write access to a previously unmodified page causes generation of Relinquish & Retry operation control signals;
(7) Accesses to PMMU 20 Bus registers by CALLM/RTM instructions;
(8) CPU Space Accesses (FC=0111) Logical Address bus passed through to Physical Address bus, no PAS is generated. If the address is not a PMMU 20 bus register, CLI is asserted with the normal PAS timing and may be externally conditioned with CPU Space decode to provide a CPU Space Address Strobe. If the address is a PMMU 20 bus register, CLI is not asserted. The operation is defined by the following table:

| CPU Space | Translation Enabled | Coprocessor, Module, or Breakpoint | Mapping | CLI | PAS |
|---|---|---|---|---|---|
| N | N | X | 1-1 | N | A |
| N | Y | X | Normal translation | | |
| Y | N | N | 1-1 | A | N |
| Y | N | Y | 1-1 | N | N |
| Y | Y | N | 1-1 | A | N |
| Y | Y | Y | 1-1 | N | N | wherein:
Y=yes
N=no or negated
A=asserted
X=don't care

8. ROOT POINTER TABLE (RPT):

In order to improve ATC 26 utilization, the PMMU 20 contains a multiple entry Root Pointer Table (RPT) 28 to hold root pointers for the most recent tasks. All entries in the ATC 26 made by searching the translation tree pointed to by the CPU Root Pointer (CRP) are marked with an indication of the index of the entry in the RPT 28 that is currently matched. This index is called the Task Alias. If the CRP register is written and a matching entry is found in the RPT 28, there may still be entries in the ATC 26 that are valid. If the new CRP value does not match an entry in the RPT 28, an entry is selected in the RPT 28 and the ATC 26 is flushed of entries that have the same index. In addition, this information is provided in the CS register so that an external data cache can be managed in the same fashion as the RPT 28.

The RPT 28 has a tag section with one tag for each of the entries. Each tag has the same fields as the CRP register. A tag is matched if the address field of the tag matches the address field of the CRP value. A valid match occurs if the address field matches and all other fields match. An invalid match occurs if the address field and L/U bit matches but one or more other fields do not match.

There is no explicit data section of the table. On a match, the output of the table is the index, 0-7, of the entry that matched. It is the responsibility of the PMMU 20 to insure that multiple matching entries never occur at the same time.

When the CRP register is written, the RPT 28 is searched for an entry with matching address field and L/U field. If the DT field in STATUS and the LIMIT field also match, the match is considered to be a valid match. However, if the address and L/U fields match but the DT field in STATUS and the LIMIT field do not match, the match is considered to be invalid If there is a valid match, the TA field of the CS register is loaded with the index of the entry in the table, and the F bit in the CS register is cleared. This indicates that the task described by the new CRP may have valid entries in the ATC 26.

If there is an invalid match, the ATC 26 is flushed of all entries that match the index value being output by the RPT 28. The TA field of the CS register is loaded with the index of the entry in the table, and the F bit in the CS register is set This indicates that any entries in an external data cache with this index should be invalidated.

If there is no match, an entry in the RPT 28 is selected for replacement by the PMMU 20. The index of the entry selected is used to flush the ATC 26 of all entries containing this task alias. The new root pointer value is then loaded into the table, the index number is placed in the CS register and the F bit is set to reflect the fact that this task alias is being reused.

If the same root pointer value is to be reused for a different task and a different translation tree, the ATC 26 must first be flushed of all entries whose task alias matches that assigned to the entry in the root pointer cache using the PFLUSHR instruction. Entries in the RPT 28 will be selected for replacement using a psuedo-LRU algorithm. The replacement and multi-task handling provided by the RPT 28 may be used by external data caches. After each write to the CRP register, the CS register should be read and its contents written to the data cache hardware. This external data cache hardware should be configured with a 3 bit extension to the Logical Address. This extension should be fed from a latch which is loaded with the lower 3 bits of the CS register. After this latch is loaded and the F bit in the CS register is set, all entries in the cache matching the value in the latch should be cleared.

We claim:

1. In a page memory management unit (PMMU) adapted to translate each of a plurality of logical addresses into a corresponding physical address using a selected one of a plurality of descriptors comprising one or more translation tables stored in a memory, the PMMU receiving each of said logical addresses and the corresponding physical address from the memory, said PMMU including:
   a cache having a plurality of storage locations for storing said translators, each of said storage locations including a write protect indicator and a read protect indicator adapted to be selectively set;
   control means for assembling each of said logical addresses and the corresponding physical address into a respective translator and controlling the storing of each translator in a selected one of said storage locations, the control means setting the write protect indicator of said one storage location in response to a write protect signal associated with the descriptor used to assemble said translator and setting the read protect indicator of said one storage location in response to a read protect signal associated with the descriptor used to assemble said translator; and
   access control means for preventing said translator from being used to translate said logical address in support of a write operation when the write protect indicator of said one storage location is set and for preventing said translator from being used to translate said logical address in support of a read operation when the read protect indicator of said one storage location is set;
wherein said logical address has an access privilege level associated therewith and said descriptor includes a selected write access privilege level and a selected read access privilege level, said control means:
   setting said write protect indicator of said one storage location to prevent said translator from being used in support of a write operation when the access privilege level associated with said logical address is logically less than said write access privilege of said descriptor; and
   setting said read protect indicator of said one storage location to prevent said translator from being used in support of a read operation when the access privilege level associated with said logical address is logically less then said read access privilege level of said descriptor;
wherein said translator is assembled by the control means and stored in said one storage location even when the access privilege associated with said logical address is not logically less than said write a read access privilege levels of said descriptor, but is not allowed by the access control means to be used in support of a write operation, even when said descriptor used to assemble said translator does not have said write protect signal associated therewith, unless the access privilege associated with said logical address is at least equal to said write access privilege or said descriptor, or is not allowed by the access control means to be used in support of a read operation, even when said descriptor used to assemble said translator does not have said read protect signal associated therewith, unless the access privilege level associated with said logical address is at least equal to said read access privilege level of said descriptor.

2. In the PMMU of claim 1, the further improvement wherein said write protect signal comprises a portion of said descriptor.

3. In the PMMU of claim 2, the further improvement wherein said read protect signal comprises a portion of said descriptor.

4. In the PMMU of claim 1, the further improvement wherein said read protect signal comprises a portion of said descriptor.

5. In the PMMU of claim 1, wherein the translation tables are comprised of one or more descriptor tables each comprised of a plurality of said descriptors, and a plurality of pointer tables each comprised of one or more table pointers to respective ones of said descriptor tables, the PMMU translating said logical address into said physical address by first combining a first portion of said logical address and a selected root pointer to access a first one of said pointer tables to obtain therefrom a table pointer to a selected one of said descriptor tables and then combining a second portion of said logical address and said table pointer to access said selected descriptor table to obtain therefrom said physical address, the improvement wherein said write protect signal comprises a portion of said table pointer and is associated with all descriptors comprising said selected descriptor table.

6. In the PMMU of claim 5, the further improvement wherein said read protect signal comprises a portion of said table pointer and is associated with all descriptors comprising said selected descriptor table.

7. In a paged memory management unit (PMMU) adapted to translate each of a plurality of logical addresses into a corresponding physical address using a selected one of a plurality of descriptors comprising one or more translation tables stored in a memory, the PMMU receiving each of said logical addresses and the corresponding physical address from the memory, said PMMU including:
  a cache having a plurality of storage locations for storing said translators, each of said storage locations including a write protect indicator adapted to be selectively set;
  control means for assembling each of said logical addresses and the corresponding physical address into a respective translator and controlling the storing of an assembled translator in a selected one of said storage locations, the control means setting the write protect indicator of said one storage location in response to a write protect signal associated with the descriptor used to assemble said translator; and
  access control means for preventing said translator from being used to translate said logical address in support of a write operation when the write protect indicator of said one storage location is set;
wherein said logical address has an access privilege level associated therewith and said descriptor includes a selected write access privilege level, said control means setting said write protect indicator of said one storage location to prevent said translator from being used in support of a write operation when the access privilege level associated with said logical address is logically less than said write access privilege level of said descriptor, wherein said translator is assembled by the control means and stored in said one storage location even when the access privilege level associated with said logical address is not logically less than said write access privilege level of said descriptor, but is not allowed by the access control means to be used in support of a write operation, even when said descriptor used to assemble said translator does not have said write protect signal associated therewith, unless the access privilege level associated with said logical address is at least equal to said write access privilege level of said descriptor.

8. In the PMMU of claim 7 wherein:
  each of said storage locations also includes a read protect indicator adapted to be selectively set;
  the control means set the read protect indicator of said one storage location in response to a read protect signal associated with the descriptor used in the assembly of said translator; and
  the access control means prevent said translator from being used to translate said logical address in support of a read operation if the read protect indicator of said one storage location is set;
the further improvement wherein said descriptor also includes a selected read access privilege level, said control means setting said read protect indicator of said one storage location if the access privilege level associated with said logical address is logically less than said read access privilege level.

9. In the PMMU of claim 8, the further improvement wherein said write protect signal comprises a portion of said descriptor.

10. In the PMMU of claim 9, the further improvement wherein said read protect signal comprises a portion of said descriptor.

11. In the PMMU of claim 8, wherein the translation tables are comprised of one or more descriptor tables each comprised of a plurality of said descriptors, and a plurality of pointer tables each comprised of one or more table pointers to respective ones of said descriptor tables, the PMMU translating said logical address into said physical address by first combining a first portion of said logical address and a selected root pointer to access a first one of said pointer tables to obtain therefrom a table pointer to a selected one of said descriptor tables and then combining a second portion of said logical address and said table pointer to access said selected descriptor table to obtain therefrom said physical address, the improvement wherein said write protect signal comprises a portion of said table pointer and is associated with all descriptors comprising said selected descriptor table.

12. In the PMMU of claim 11, the further improvement wherein said read protect signal comprises a portion of said table pointer and is associated with all descriptors comprising said selected descriptor table.

13. In the PMMU of claim 7, the further improvement wherein said write protect signal comprises a portion of said descriptor.

14. In the PMMU of claim 7 wherein the translation tables are comprised of one or more descriptor tables each comprised of a plurality of said descriptions, and a plurality of pointer tables each comprised of one or more table pointers to respective ones of said descriptor tables, the PMMU translating said logical address into said physical address by first combining a first portion of said logical address and a selected root pointer to access a first one of said pointer tables to obtain therefrom a table pointer to a selected one of said descriptor tables and then combining a second portion of said logical address and said table pointer to access said selected descriptor table to obtain therefrom said physical address, the improvement wherein said write protect signal comprises a portion of said table pointer and is associated with all descriptors comprising said selected descriptor table.

15. In a paged memory management unit (PMMU) adapted to translate each of a plurality of logical addresses into a corresponding physical address using a selected one of a plurality of descriptors comprising one or more translation tables stored in a memory, the PMMU receiving each of said logical addresses and the corresponding physical address into a respective translator, said PMMU including: said
  a cache having a plurality of storage locations for storing said translators, each of said storage locations including a read protect indicator adapted to be selectively set;

control means for assembling each of said addresses and the corresponding physical address into a respective translator and controlling the storing of each translator in a selected one of said storage locations, the control means setting the read protect indicator of said one storage location in response to a read protect signal associated with the descriptor used to assemble said translator; and access control means for preventing said translator from being used to translate said logical address in support of a read operation when the read protect indicator of said one storage location is set;

wherein said logical address has an access privilege level associated therewith and said descriptor includes a selected read access privilege level, said control means setting said read protect indicator of said one storage location to prevent said translator from being used in support of a read operation when the access privilege level associated with said logical address is logically less than said read access privilege level of said descriptor, wherein said translator is assembled by the control means and stored in said one storage location even when the access privilege level associated with said logical address is not logically less than said read access privilege level of said descriptor, but is not allowed by the access control means to be used in support of a read operation, even when said descriptor used to assemble said translator does not have said read protect signal associated therewith, unless the access privilege level associated with said logical address is at least equal to said read access privilege level of said descriptor.

16. In the PMMU of claim 15 wherein:

each of said storage locations also includes a write protect indicator adapted to be selectively set;

the control means set the write protect indicator of said one storage location in response to a write protect signal associated with the descriptor used in the assembly of said translator; and the access control means prevent said translator from being used to translate said logical address in support of a write operation if the write protect indicator of said one storage location is set;

the further improvement wherein said descriptor also includes a selected write access privilege level, said control means setting said write protect indicator of said one storage location if the access privilege level associated with said logical address is logically less than said write access privilege level.

17. In the PMMU of claim 16, the further improvement wherein said write protect signal comprises a portion of said descriptor.

18. In the PMMU of claim 17, the further improvement wherein said read protect signal comprises a portion of said descriptor.

19. In the PMMU of claim 16, wherein the translation tables are comprised of one or more descriptor tables each comprised of a plurality of said descriptors, and a plurality of pointer tables each comprised of one or more table pointers to respective ones of said descriptor tables, the PMMU translating said logical address into said physical address by first combining a first portion of said logical address and a selected root pointer to access a first one of said pointer tables to obtain therefrom a table pointer to a selected one of said descriptor tables and then combining a second portion of said logical address and said table pointer to access said selected descriptor table to obtain therefrom said physical address, the improvement wherein said write protect signal comprises a portion of said table pointer and is associated with all descriptors comprising said selected descriptor table.

20. In the PMMU of claim 19, the further improvement wherein said read protect signal comprises a portion of said table pointer and is associated with all descriptors comprising said selected descriptor table.

21. In the PMMU of claim 15, the further improvement wherein said write protect signal comprises a portion of said descriptor.

22. In the PMMU of claim 15 wherein the translation tables are comprised of one or more descriptor tables each comprised of a plurality of said descriptors, and a plurality of pointer tables each comprised of one or more table pointers to respective ones of said descriptor tables, the PMMU translating said logical address into said physical address by first combining a first portion of said logical address and a selected root pointer to access a first one of said pointer tables to obtain therefrom a table pointer to a selected one of said descriptor tables and then combining a second portion of said logical address and said table pointer to access said selected descriptor table to obtain therefrom said physical address, the improvement wherein said write protect signal comprises a portion of said table pointer and is associated with all descriptors comprising said selected descriptor table.

* * * * *

UNITED STATES PATENT AND TRADEMARK OFFICE
CERTIFICATE OF CORRECTION

PATENT NO. : 4,890,223

DATED : December 26, 1989

INVENTOR(S) : Michael Cruess, et al

It is certified that error appears in the above-identified patent and that said Letters Patent is hereby corrected as shown below:

In claim 15, at column 33, line 25, change "on storage" to --one storage--.

Signed and Sealed this

Eighth Day of January, 1991

Attest:

HARRY F. MANBECK, JR.

Attesting Officer

Commissioner of Patents and Trademarks